Oct. 26, 1965 B. J. WARMAN 3,214,524

SECTIONALIZED AUTOMATIC SWITCHING SYSTEM

Filed Dec. 18, 1961 12 Sheets-Sheet 1

Oct. 26, 1965 B. J. WARMAN 3,214,524

SECTIONALIZED AUTOMATIC SWITCHING SYSTEM

Filed Dec. 18, 1961 12 Sheets-Sheet 11

United States Patent Office 3,214,524
Patented Oct. 26, 1965

3,214,524
SECTIONALIZED AUTOMATIC SWITCHING SYSTEM

Bloomfield James Warman, London, England, assignor to Associated Electrical Industries Limited, London, England, a company of Great Britain
Filed Dec. 18, 1961, Ser. No. 160,174
Claims priority, application Great Britain, Dec. 21, 1960, 43,921/60
26 Claims. (Cl. 179—22)

This invention relates to automatic telecommunication, for example telephone exchange, switching systems.

Our earlier application Serial No. 122,137 filed July 6, 1961 is concerned with what is thought to represent an entirely new concept in the design of such switching systems. Basically in a telephone or like exchange embodying this concept, the switching equipment which permits the selective establishment of communication paths between lines connected to the exchange is provided in a plurality of sections which together afford between any two of said lines, through the switching equipment, a plurality of possible communication paths of which the incoming portions are respectively afforded by various ones of said sections and the outgoing portions are likewise afforded by various ones of the sections, and a section selecting arrangement is provided which in respect of a call between two lines and on the basis of information conveyed to it as to pertinent conditions existing in the several sections, is operable to cause the establishment of a connection between the calling and called lines over such one of the possible paths as will give best advantage having regard to said conditions.

The section selection arrangement in effect makes a discrete choice of route through the exchange in respect of each call and by doing so with regard to the conditions in the several sections gives the result that the probability of successful connection of any call is improved beyond that which could be expected on the more usual basis of pure chance call routing. In this connection it may be mentioned that even although the switches in each section of a sectionalised exchange according to the invention may be fully available within the section (a possibility which, dependent on various considerations, may or may not be embodied in a particular exchange sectionalised in accordance with the invention) the overall availability of the switches is limited by virtue of the fact that the sections in themselves are mutually separate, with no direct access between one rank of switches in one section and a succeeding rank of switches in another section. In prior art systems with limited availability, it is in general a matter of pure chance whether any particular call, itself originating on a random basis, will find that there is available for it a free interconnection path that can afford connection between calling and called lines. The switching quantities (number and/or size of switches) required to give any call a maximum chance of being successfully established, have therefore to be estimated on the basis of this pure chance traffic and are correspondingly relatively great. However in a sectionalised exchange with section selection as aforesaid, the traffic into each section is no longer purely random but is in effect selected, according to the relative suitability of the section to deal with it, from the randomly originating total traffic. In particular each call is routed through the exchange in such manner as to give subsequent calls a greater chance of being successfully established. There is a simulated, through not actual, availbility between the sections and each section can moreover act in effect as an organised overflow for the others. The switching equipment is therefore better utilised, with the result that the total switching requirements can be reduced for a given overall grade of service, or conversely that the grade of service can be improved for a given quantity of switching equipment. This economy of switching equipment is achieved at the expense of some additional apparatus, in particular the apparatus required to effect section selection, but the cost of this appartus can be offset to a considerable extent by utilising it, at least in part, so as to provide other facilities likely to be required of the exchange. For instance the selection of one of several possible paths through the exchange sections requires that the routes followed by these paths through the sections should first be ascertained, and this implies that not only must the identity of the called line be known but also that of the calling line. Therefore calling line identification facilities have to be provided, but these facilities may in any event be required if the exchange has to be equipped for automatic message accountancy. When used for this latter purpose alone the provision of calling line identification tends to be disproportionately expensive, but by using it also for the purposes of the sectionalised exchange with section selection its cost can be greatly offset not only by the mere fact of its double use but also by the economies arising from the sectionalisation as already explained.

Another advantage of sectionalising an exchange as aforesaid, in which connection it has to be appreciated that at least all subscribers' lines connected to the exchange would have access to all sections, is that an important degree of security against loss of service due to a fault in the exchange can be obtained. For instance failure of one section leaves the others still able to provide a path through the exchange for any local call, and also for any incoming or outgoing junction call provided that each incoming junction line and at least each outgoing junction group (if not each line in such group) have also access to all sections, as is contemplated would be usual. The faulty section would simply be effectively busied to the section selecting arrangement, which would therefore not select a path involving that section.

These advantages arising from the basic concept of sectionalising the switching equpiment of the exchange and providing a section selecting arrangement as aforesaid, and other advantages that can be obtained by allying this basic concept with other techniques which may or may not be already known in other exchange arrangements, are more fully explained in our said copending application, to which reference should be had.

The present invention concerns crossbar or crosspoint exchange switching systems embodying this same basic concept, being particularly but not exclusively applicable to cross-point switching systems in which the switching is effected by means of so-called reed relays at the cross-points.

In general a crossbar or cross-point switching system employs a number of what will be called coordinate switching arrays each of which affords selective access between two sets of multiple-conductor conenctions of which the connections of one set are considered to be, and in practice usually are, arranged co-ordinately or matrix-wise in relation to those of the other set, so as to define between the two sets a number of crosspoints at each of which there is some form of multiple switching means operable to connect the several conductors of the one connection at the cross-point individually and severally to those of the other connection at the cross-point. Such a co-ordinate switching array may be constituted by a crossbar switch of well-known form, or alternatively it may be constituted by an array of relays or electronic switching devices. In the case of relays, each cross-point is usually equipped with a single relay having an appropriate number of contact pairs having regard to the number of conductors in each said multiple-conductor connection: for instance if each connection includes conductors corresponding to the usual +, −, and P-wires associated with a communication path in a telephone exchange, then each cross-point relay would have a contact pair for each of these conductors, with an additional pair for any other conductor, such as a holding conductor, that may be also included in the connection. In the case of electronic switching devices each cross-point is usually equipped with an appropriate number of such devices determined on the same basis. The general principles of building up switching ranks from cross-point switching arrays are well-known.

According to the invention, in a telephone or like switching system employing co-ordinate switching arrays, each of at least certain lines served thereby has access through a first co-ordinate switching rank into a number of separate switching sections each of which comprises one or more co-ordinate switching ranks which are separate from those of the other sections (that is, not directly interconnected with them) and afford selective access, via said first rank, between said lines on the one hand and, on the other hand, a plurality of linking connections (hereafter referred to as links) which afford interconnection between the switching sections, externally thereof, and with them afford for a call between two lines, a plurality of possible communication paths each extending between the calling and called lines through one section on the incoming (calling) side of an included link and through another section on the outgoing (called) side, a section selection arrangement being provided which, in respect of any particular call and on the basis of information conveyed to it as to the conditions existing in the several sections, can select from said paths, for the establishment of the call, the path which includes the sections and link that can do so with best advantage having regard to these conditions. The lines having selective access into the several sections via the first switching rank may for instance be telephone subscribers' lines and possibly also incoming junction lines from other exchanges. Outgoing junction lines to other exchanges may also have selective access to the several sections, or to some of them, via the first switching rank, or may be connected directly to the sections.

Each of the links referred to may, and in an exchange embodying the invention preferably would, present a plurality of link paths of which an available one would be selectively chosen for inclusion in that one of the aforesaid possible communication paths which includes the link. In a link serving local calls, that is a link capable of forming part of a possible communication path between two local subscribers' lines, the or each link path afforded by it could include a supervisory transmission bridge circuit which would preferably be made reversible so as to be able to supervise a call over the link path irrespective of which is the incoming end of the link path (and connected towards the calling line) and which is the outgoing end (connected towards the called line). In other words, by appropriate switching, either side of the bridge circuit could be made to act as the incoming side while the other side acts as the outgoing side. The use of reversible supervisory bridge circuits has the advantage that their availability is effectively double that of non-reversible circuits, thereby giving increased efficiency so that the total number of supervisory circuits required for the expected traffic can be significantly reduced. This in turn implies a reduced amount of switching equipment to give access to the supervisory transmission bridge circuits. In a link serving junction calls, that is, calls from an incoming junction or to an outgoing junction, the or each link path may afford direct interconnection without the inclusion therein of a transmission bridge circuit, because such bridge circuit may already be present in the junction circuits.

As will be explained more fully later, the selection for a call of a particular pair of sections and a link between them may preferably be made on the basis of tending to "pack" all calls into the switching arrays of the sections in an orderly manner so organised as to minimise the chances of subsequent calls being blocked. Organised call packing is already, of course, a known technique in crossbar switching systems, but with the present invention the section selecting arrangement can choose the sections into which any call can best be packed, so that a more advantageous overall packing and consequent greater freedom from call blocking can be obtained. Furthermore, as the sections into which a call can be packed in this manner will in the majority of cases be the ones with the lowest traffic level, the traffic will tend to be balanced between the sections and between the links. Both these features lead to the need for a lesser amount of switching equipment for a given grade of service.

The first switching rank may give each line access in each section to one switching array which is included in a primary switching rank in the section, this primary switching rank giving access to a number of switching arrays included in a secondary switching rank which gives access to the links. The switching arrays of this secondary rank may also give access to registers as will be described later. The switching equipment in the first rank and in the several sections may be divided into units each serving a proportion of the total number of lines: in particular the first switching rank may be divided into a number of units each affording access between a proportion of the lines on the one hand and a plurality of connections extending into the several switching sections on the other hand, while the switching arrays of the several sections considered together are divided into units of which the switching arrays included in a particular unit in a particular section constitute a sub-unit and afford access between on the one hand a proportion of said connections extending into the section from the first rank (the connections constituting this proportion not necessarily being all from the same unit in the first rank), and on the other hand links by which the sub-unit is interconnected with certain of the sub-units from the other sections, these last-mentioned sub-units including at least one from each unit. In other words, if each section has its switching arrays divided into, say, three sub-units U1, U2 and U3 (so that the U1 sub-units from the several sections constitute one unit, the U2 sub-units constitute another unit, and so on) then each sub-unit in any section would have links interconnecting it at least with a U1 sub-unit from another section, a U2 sub-unit from another section and a U3 sub-unit from another section, these particular U1, U2 and U3 sub-units preferably but not necessarily being in the same section. Some such arrangement of the linking circuits is necessary in order that the lines served by any particular unit may have access both to other lines served by the same unit and to lines served by the other units.

Assuming that, as would be preferred from the point of view of equipment economy, the links are able to serve in both directions as regards communication through them between the units that they interconnect (requiring that any transmission bridge circuits included in them are reversible) then there would be required between any two sections a minimum of one self-link for each switching unit of the sections, that is, a link which, in order to afford a communication path between any two lines served by the unit, affords interconnection between respective sub-units of this unit in the two sections, and one cross-link provided for each pair of units to afford a communication path between two lines respectively served by these units, such cross-link affording interconnection between those sub-units of the units of the pair that are respectively in the two sections concerned: the number of links thus required would be $$y(x+(x-1)+(x-2)\ \ldots\ +(x-x))$$

where $y$ is the number of sections and $x$ is the number of units into which the switching equipment of the sections is divided. This mode of organization of the links is more fully described in our said earlier application.

As an alternative arrangement, which may in some cases be required in order to avoid undue limitation of availability, each sub-unit in each section may have links affording interconnection between it and all the sub-units of the next section, taking the sections in a given order, with the last section being likewise interconnected with the first. This would require $yx^2$ links where $y$ and $x$ have the same significance as before. Whether or not this arrangement is necessary to avoid undue limitation, it is advantageous in that it results in doubling the number of possible communication paths between any two lines which are served by the same unit, thereby creating a greater choice of paths and a greater chance of one of them being available. This last arrangement of the links will be considered again later when describing the drawings.

The foregoing division of the switching arrays into units, the organization of which may be more easily understood once consideration has been given to the accompanying drawings and their description, gives the result that, although the switching arrays in the several sections now have a limited avalability in that they are available to only a proportion of the total number of lines, nevertheless the action of the section selecting arrangement in making an optimum selection of a path for a call simulates a greater availability than is in fact present, so that here again there is a resulting reduction in the amount of switching equipment required for a given grade of service.

In our aforesaid earlier application, it is suggested so to connect the lines that those served by one unit in one section are distributed over two or more units in another section. It is explained that this can give further advantage in respect of traffic balance and of the amount of traffic that can be handled, because there is then a tendency to balance traffic not only between the sections but also in and between the units. This leads to a better utilization of the switching equipment. Moreover since the traffic from any one line unit is spread over more than one unit in some of the switching sections there is a greater availability of links to the line unit.

With the present invention a similar effect can be achieved, with the sections and the first switching rank divided into switching units as aforesaid, by arranging that whereas the connections extending from any one unit of the first switching rank to one of the switching sections may all go to the same sub-unit in the section, the connections extending from the same unit in the first rank to another section are distributed over two or more sub-units of this latter section. With this arrangement it becomes necessary, in order to avoid unacceptable limitation of availability, to use a link arrangement by which each sub-unit in one section is interconnected with all of the several sub-units of the next section in the previously explained manner requiring $yx^2$ links ($x$=the number of units, $y$=the number of sections).

As regards the determination of, and selection between, the several possible communication paths for a call between two lines, there may be provided individually for each section a calling side route identifier and a called side route identifier which, on the basis of information fed into them regarding the locations of the calling and called lines on the exchange, respectively determine what routes through the first switching rank and their own section are available on the one hand between the calling line and a link affording connection towards the called line via another section, and on the other hand between the called line and a link affording connection towards the calling line via another section. With the switching equipment of the sections divided into units as previously described, the relevant links would be those affording interconnection of the sections between the calling line's unit and the called line's unit. These route identifiers may co-operate in pairs, each pair consisting of the calling side route identifier of one section and the called side route identifier of another section, in determining which of the possible plurality of complete communication paths between the calling and called lines are actually available. Thus where each link affords a number of linking paths, the two route identifiers of each such pair may feed into a link path determinator, individual to the pair, markings which indicate the busy or free conditions of the link paths which have available access to the calling or called line as the case may be, thereby enabling the determinator to ascertain, and to indicate by appropriate markings, which of these link paths are free and have access to the calling and called lines over available routes both on their calling and on their called sides, each such path being therefore available for inclusion in a communcation path extending between the calling and called lines via that link path and the relevant routes identified in the two sections which it interconnects. From the several link path determinators, the last-mentioned markings are passed into a selection and comparison arrangement in which, from the free link paths indicated by these markings, one is selected which extends between those sections which can take the call with optimum advantage. The factors that may be taken into consideration in this respect have already been indicated. For instance the selection may be made on the basis of tending to pack the calls "furthest towards one and": that is, in each link between two sections the link paths that may be presented for selection at any one time may be given a certain ranking (order of precedence), and the selection may be made so as generally (but with possible exceptions) to choose the presented path that is of highest rank not only as compared with other presented link paths between the same two sections but as compared also with presented link paths between other pairs of sections.

Selection now having been made of a link path between two sections, and therefore of an available communication path extending between the calling and called lines via the relevant routes through these sections, a marker or markers for controlling the establishment of this finally selected communication path can be fed from the relevant route identifier and from the selection and comparison arrangement the requisite information for doing so. As the finally selected communication path will always extend through one section on the calling side and another section on the called side, it will be apparent that if, as is peferred, the several sections have their own markers, a marker will only have to deal with one side of a call (calling or called) at any time. Where the sections are divided into sub-units as already described, each sub-unit may have its own marker in order to give greater security against failure and to increase the traffic carrying capacity. It will also be appreciated that the markers will function similarly whether they are dealing with the calling side or with the called side. Where the link path in a selected through communication path includes a reversible transmission bridge circuit as previously mentioned, the markers may also determine the proper connection of the transmission bridge circuit having regard to the direction in which it has to act. The route identifiers, link path selectors and comparator together constitute the section selecting arrangement previously referred to.

As an alternative to having separate calling side and called side route identifiers it is possible, since the actions required can be identical, for a single unit to be used for both calling side route identification and called side route identification, together with some means for storing the one set of route information while the other is being ascertained. This would, however, entail some loss of security and might possibly give rise to a need for the provision of duplicate (stand-by) equipment to cover failure. The use of separate calling and called side route identifiers for each section as described, allows each to operate independently for both incoming and outgoing calls: on the failure of one of them (calling side or called side) its section can be exclusively employed for calls of the opposite type (that is, called or called respectively), this being determined by the comparator which, in selecting between the sections will still ensure that this particular section is adequately exploited. This security against failure can be further enhanced, where the switching equipment is divided into units as hereinbefore considered, by the use for each section of route identifiers each of which includes route determining and identifying apparatus individual to each sub-unit rather than to the section as a whole, the total amount of apparatus required for each route identifier being not greatly increased because the number of possibilities that have to be tested and indentified remains the same.

In further describing the invention as it may be applied to a switching system employing co-ordinate switching arrays preferably but not necessarily constituted by cross-point arrays using reed relays, reference will be made to the accompanying drawings in which.

Figure 4:
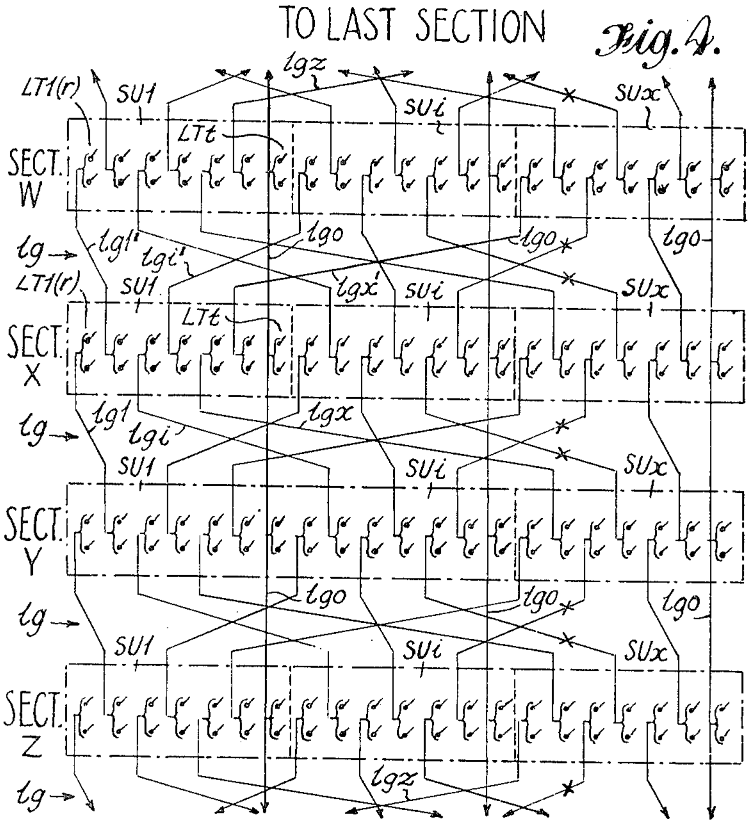
Figure 6:
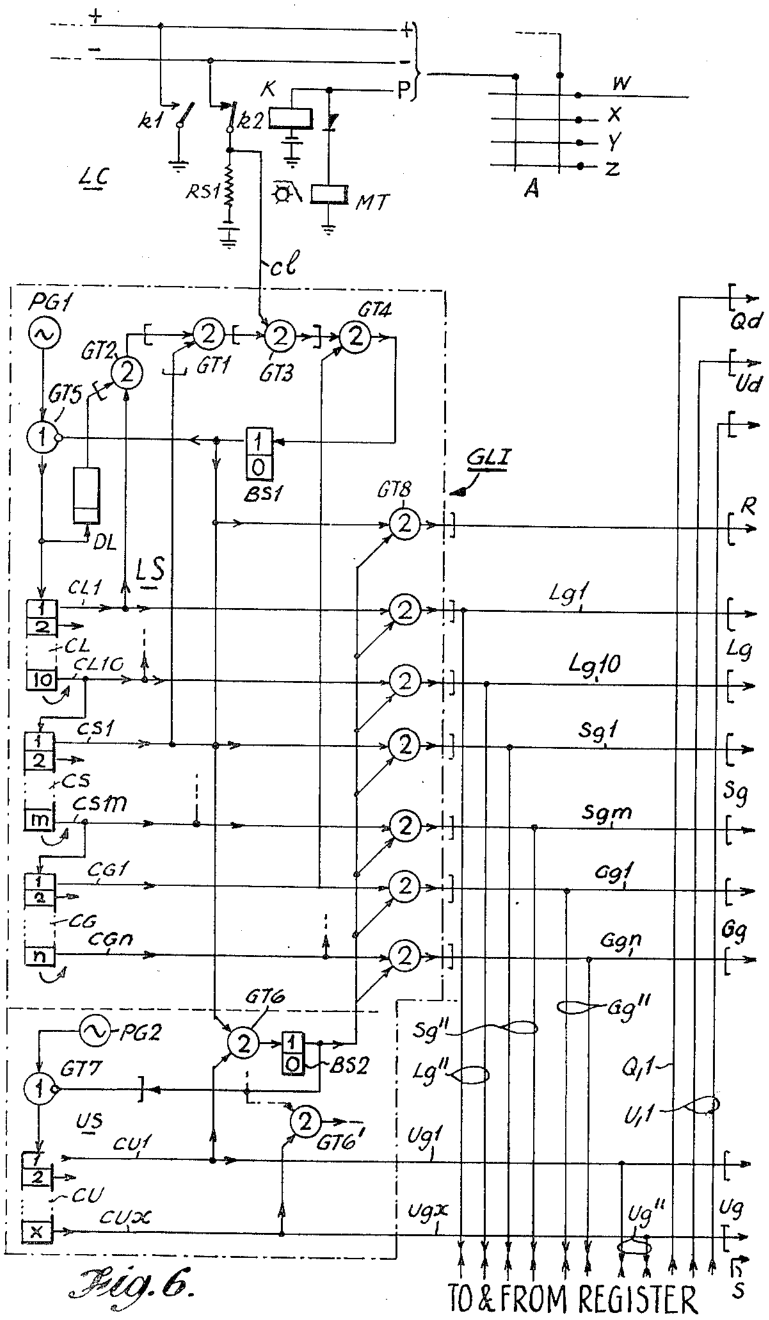
Figure 9:
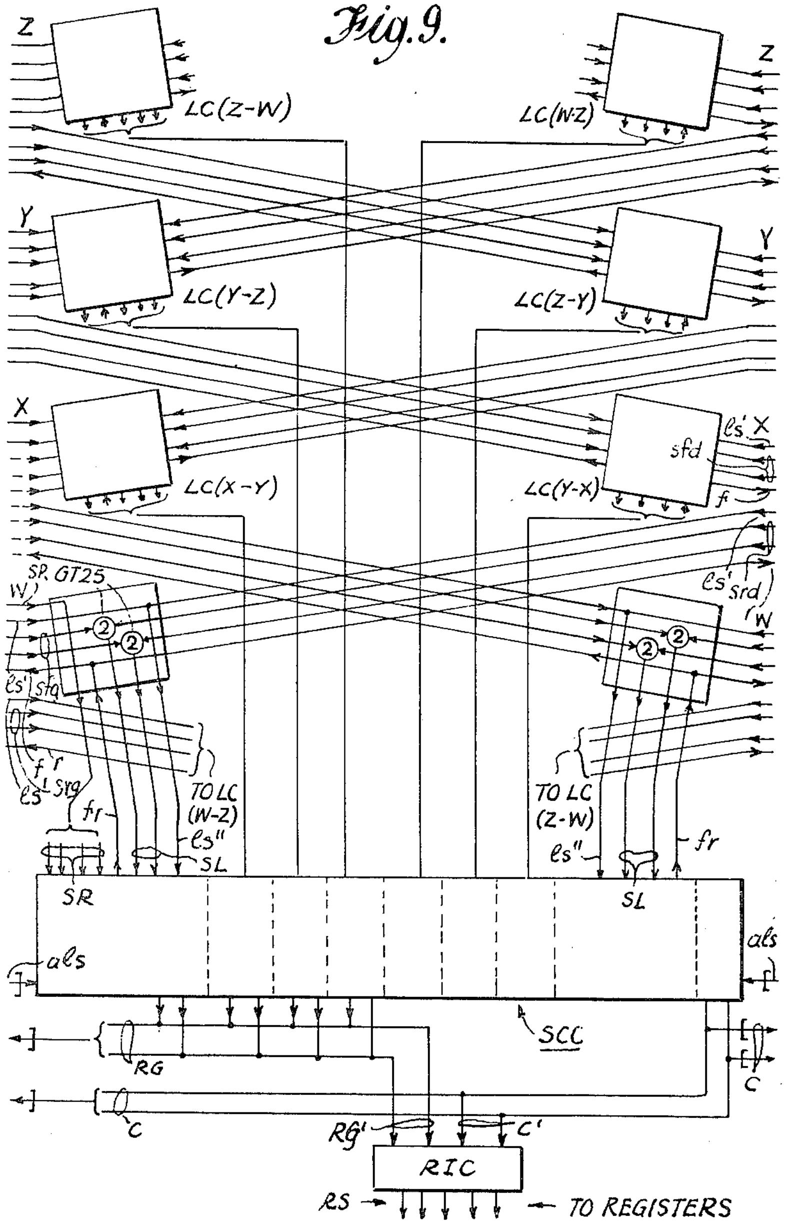
Figure 12:
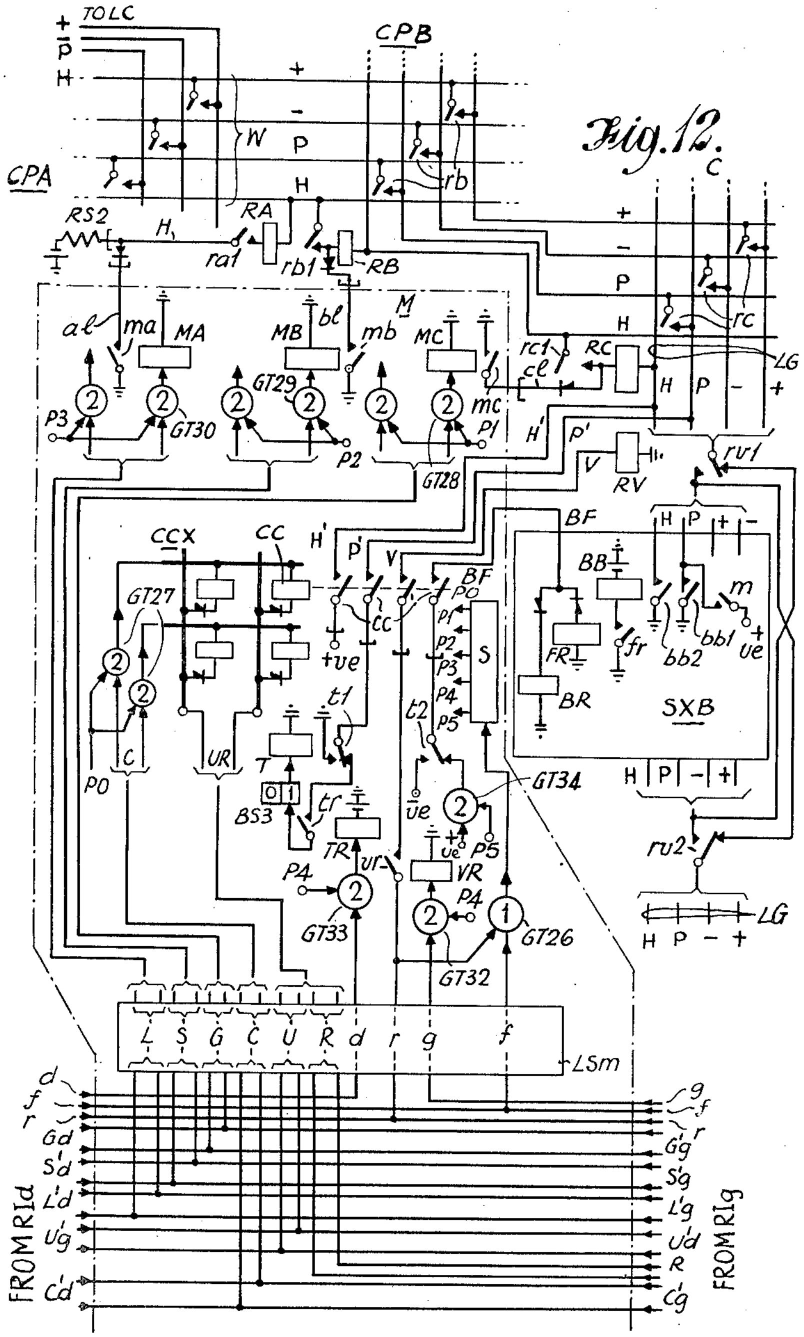
Figure 13:
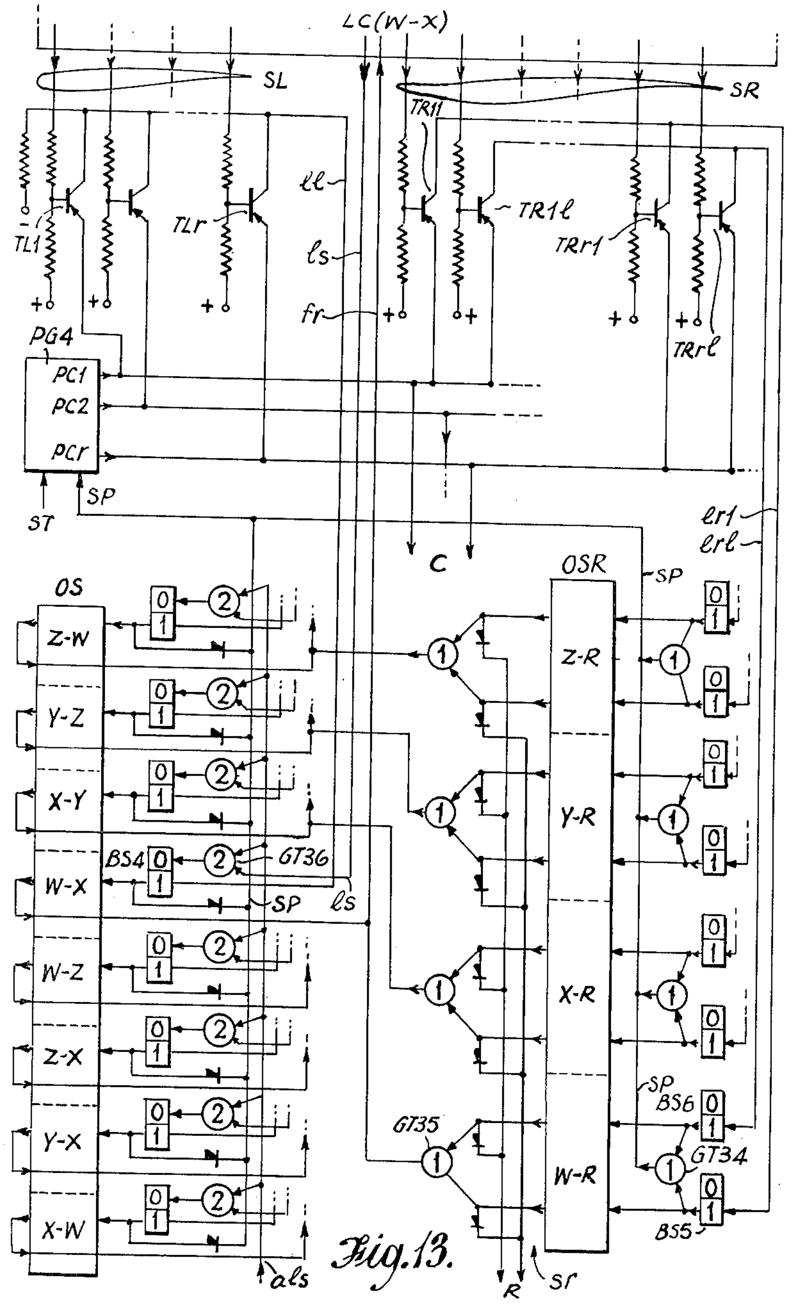

FIG. 4 schematically illustrates a particular organisation of linking groups interconnecting the sections;

FIGS. 5(*a*) and (*b*) schematically illustrate modified switching arrangements for the first switching rank;

FIGS. 6–11, laid side-by-side in order, with FIG. 6 on the extreme left, illustrate in logical symbolism the apparatus involved in the establishment of a call in an exchange embodying the invention;

FIG. 12 illustrates by way of example a suitable arrangement for the selector and comparator represented in block form in FIG. 9; and FIG. 13 illustrates a marker and the manner in which it is arranged for controlling the establishment of a through connection.

Figure 1:
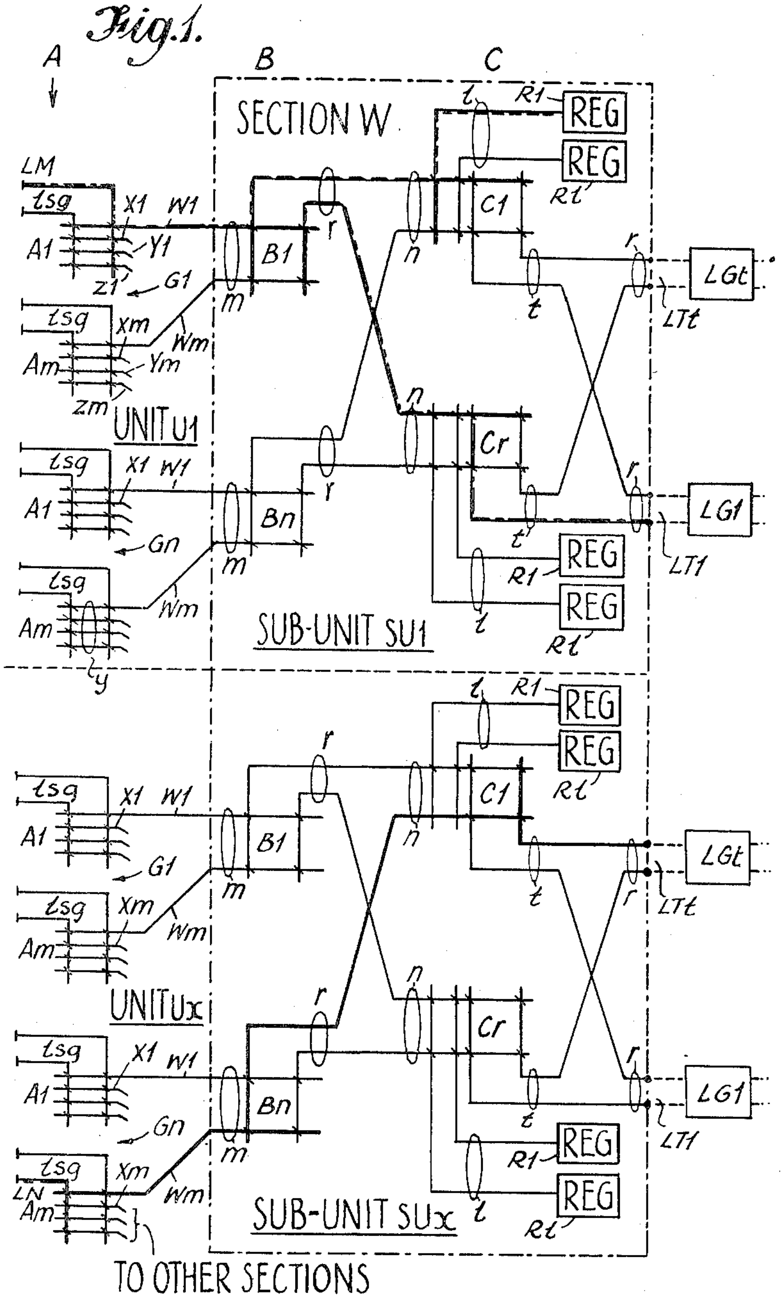
FIG. 1 is a schematic trunking diagram for a first switching rank and one switching section of an exchange embodying the invention.

Referring firstly to FIG. 1 there is shown in diagrammatic form the connections between three switching ranks A, B and C each consisting of an assemblage of coordinate switching arrays. Each such array is shown in a schematic fashion as a matrix of horizontal and vertical lines each of which represents a multiple-conductor connection. Each switching array, by means of some suitable form of switching means at the cross-points between the vertical and horizontal connections, affords selective access between a set of such connections on one side and another set on the other side. To keep the drawing as open as possible and thereby lend to greater clarity, only the first and last connections of each set are represented, except for the sets of horizontal connections in the A rank where each switching array such as A1 and A$m$ have been shown with four horizontal connections lettered W, X, Y and Z. The words vertical and horizontal are of course used only for convenience of description in accordance with the conventional terminology of crossbar and cross-point switching systems: they do not necessarily relate to actual physical dispositions, and indeed in a constructed exchange some connections referred to as horizontal may in fact be vertical and vice versa.

The switching arrays of the A rank, corresponding to the first switching rank previously referred to, are divided into a number of switching units U1 . . . U$x$ each of which is itself divided into a number of switching groups G1 . . . G$n$ each comprising a number of switching arrays A1 . . . A$m$. Each of these switching arrays serves a sub-group $lsg$ of the lines connected to the exchange. The number of lines per sub-group would conveniently be ten so that there would be the same number of vertical connections (i.e. ten) in each switching array of the A rank. For a 5,000 line exchange, to quote some specific figures by way of example, there could be five units ($x$=5) each serving a thousand lines which are divided into ten groups ($n$=10) each again sub-divided into ten sub-groups ($m$=10). These numbers are given purely for illustrative example and could vary according to the size of the exchange, the grade of service required, the volume of traffic expected, and so on.

Figure 2:
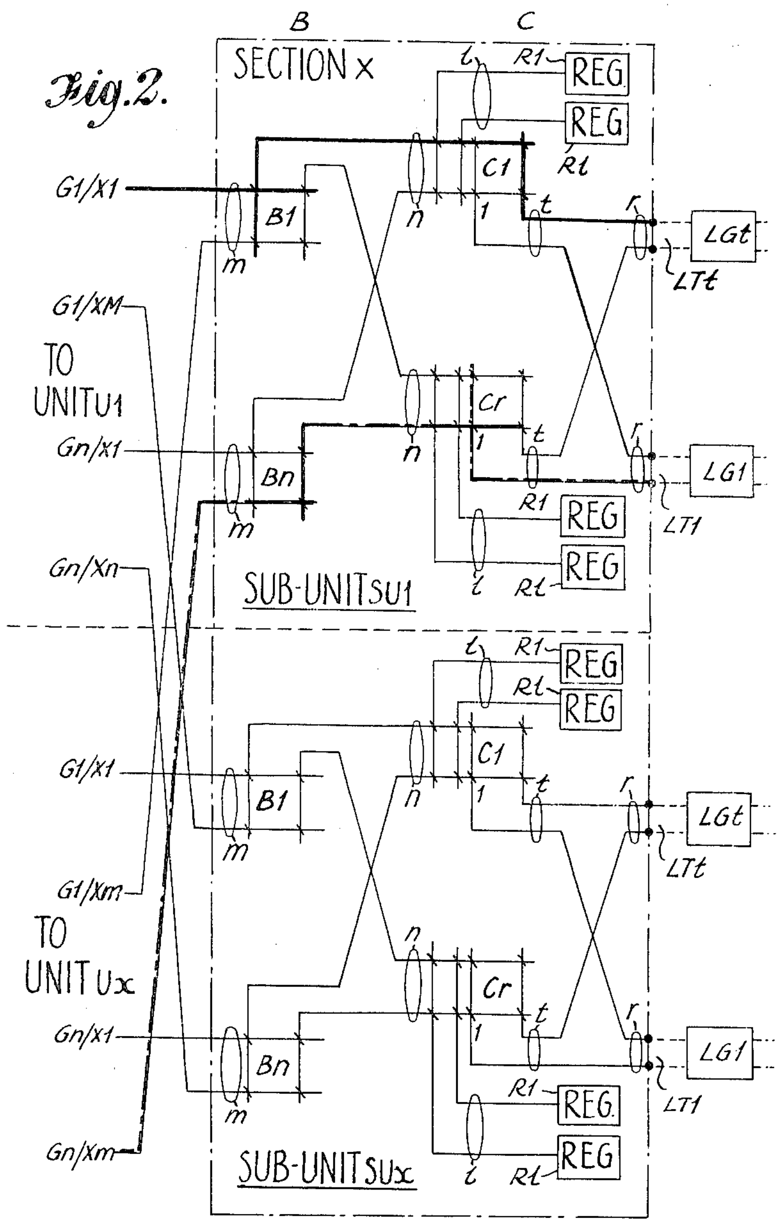
FIG. 2 is a schematic trunking diagram for another section of the exchange.

The switching arrays in ranks B and C are provided in a number of mutually separate sections of which one section (W) is represented in FIG. 1 and another section (X) is represented in FIG. 2. The number of sections may vary in dependence on the traffic expected and on other considerations, but for the present purposes it will be assumed that there are four such sections W, X, Y and Z all of which are identical as regards the provision and interconnection therein of the switching arrays in ranks B and C. The totality of the B and C switching arrays in the several sections is also divided into $x$ units, the B and C arrays included in the several units in each section forming sub-units SU1 . . . SU$x$.

In each of the sub-units SU1 . . . SU$x$ in each section, the number ($n$) of B rank switching arrays B1 . . . B$n$ corresponds to the number of switching groups G1 . . . G$n$ in each switching unit of the A rank, while the horizontal connections in each of the B rank switching arrays correspond in number ($m$) to the number of switching arrays A1 . . . A$m$ in each switching group of the A rank.

Figure 3:
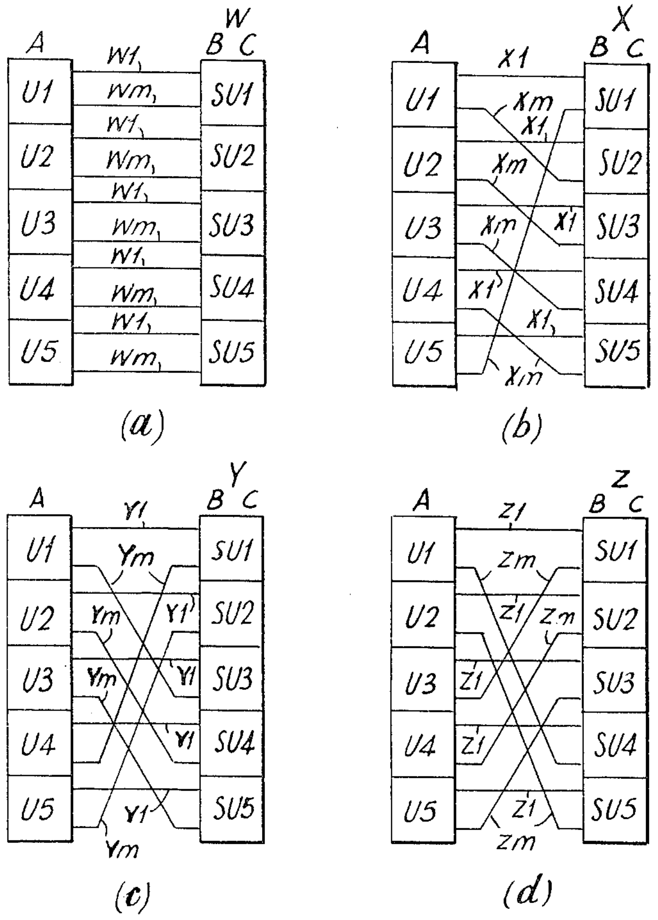
FIG. 3 is a block diagram showing the different modes of connection from the first rank into the several sections.

The W connections from the A rank switching arrays, typified by connections W1 for the A1 arrays and W$m$ for the A$m$ arrays, extend to the B rank switching arrays in section W. The X connections, likewise typified by connections X1 and X$m$, extend to the B rank arrays in section X (FIG. 2), while the Y and Z connections, as typified by Y1, Y$m$ and Z1, Z$m$, extend to the B rank switching arrays in sections Y and Z (not shown). W, X, Y and Z connections corresponding to each other in the several switch groups G1 . . . G$n$ in the several units U1 . . . U$x$ go to corresponding horizontal connections in different ones of the B switching arrays in the relevant section: for instance all the W1 connections go to the first horizontal connections in different B rank switching arrays, all the W$m$ connections go to the $m$th horizontal connections in different B rank switching arrays in section W, all the X1 connections go to the first horizontal connections in different B rank switching arrays in section X . . . and so on. However, for the reasons already explained, whereas the W connections from any one of the units U1 . . . U$x$ all go to B rank switching arrays in a single one of the sub-units SU1 . . . SU$x$ in section W, certain of the X connections from any one of the units U1 . . . U$x$ go to B rank switching arrays in one sub-unit in section X, while others of these X connections go to B rank switching arrays in another sub-unit in section X. Thus the W1 and W$m$ connections from groups G1 . . . G$n$ in unit U1 are shown as all going to switching arrays B1 . . . B$n$ in sub-unit SU1 of section W; on the other hand, whereas the X1 connections from groups G1 . . . G$n$ are shown as going to switching arrays B1 . . . B$n$ in sub-unit SU1 of section X (see FIG. 2), the X$m$ connections are shown as going to switching arrays B1 . . . B$n$ in sub-unit SU$x$. If, for example, there were ten switching arrays A1 . . . A10 ($m$=10) in each of the groups G1 . . . G$n$ in units U1 . . . U$x$, then the (ten) W connections W1 . . . W10 extending into section W from each group in unit U1, say, could all go to the same sub-unit SU1 in that section, going in fact to the same B rank switching array in this sub-unit, whereas of the ten X connections X1 . . . X10 from each group in the same unit (U1), the first five, X1 . . . X5, could go to the corresponding sub-unit SU1 in section X while the other five, X6 . . . X10, go to another sub-unit such as SU$x$ in that section. A similar scheme of interconnection between the A and the B ranks would be employed for the Y and Z sections. In particular, if there are at least four sub-units per section ($x=4$) then as regards each unit of the A rank (for example U1) all of the W connections could go to the corresponding sub-unit SU1 in section W as already described, the X connections could be distributed between sub-units SU1 and SU2 in section X, the Y connections could be distributed between sub-units SU1 and SU3 in section Y, and the Z connections could be distributed between sub-units SU1 and SU4 in section Z. The overall scheme of interconnection between the A and B ranks is organised on an orderly basis and may be as represented in abbreviated schematic form in FIG. 3, which takes five A rank units U1 . . . U5 and five sub-units SU1 . . . SU5 per section by way of example. The import of FIG. 3 is thought to be self-evident, the four parts (*a*) . . . (*d*) of this figure relating to the connections from the A rank into the four switching sections W, X, Y and Z respectively.

It will be observed that each unit U1 . . . U$x$ serves a proportion of the total number of lines and that each sub-unit SU1 . . . SU$x$ serves, that is, is accessible to a like proportion of the totality of lines, although the lines served by any sub-unit SU1 . . . SU$x$ are not served by the same unit U1 . . . U$x$: for example in FIG. 2 some of the lines served by sub-unit SU1 are served by unit U1 and some by unit U$x$.

The B and C rank switching arrays in each sub-unit SU are cross-connected with each other in well-known manner such that each B array has access to all C arrays in the same sub-unit and each C array has access to all B arrays in the same sub-unit. To this end each B array has a number of vertical connections corresponding to the number ($r$) of C arrays in a sub-unit, and the number of horizontal connections in each C array corresponds to the number ($n$) of B arrays in the sub-unit. Here again, the interconnections are organised in an orderly fashion: in particular, corresponding horizontal connections in the several C arrays all go to the same B arrays and corresponding vertical connections in the several B arrays all go to the same C array.

A certain number ($l$) of the vertical connections of each C array give access to individual registers R1 . . . R$l$. The remaining ($t$) vertical connections of each C array give access via terminal groups LT1 . . . LT$t$ to one side of individual link paths included in respective link groups LG1 . . . LG$t$. The number ($r$) of C arrays per sub-unit corresponds to the number of link paths per group which will be chosen according to the expected traffic. For instance calculations based on expected traffic may show that, say, sixteen link paths should be provided for cross-linking between any two switching units of the several sections (each such unit consisting of one sub-unit from each section) and a like number for back-linking in respect of each such unit. With four sections an appropriate number of link paths per link group LG would then be four.

In FIG. 4, which is purely schematic, there is shown for each of three sub-units SU1, SU$i$, SU$x$ in each of four sections W, X, Y and Z, a plurality of terminal groups LT which correspond to the terminal groups LT1 . . . LT$t$ already referred to in connection with FIGS. 1 and 2. As already explained, interconnection is afforded between setions by link groups (LG in FIGS. 1 and 2) which are connected between such terminal groups in certain sub-units of the sections concerned. In FIG. 4 these link groups are each represented by a single line *lg*. As will appear from a study of FIG. 4, the scheme of connection of the link groups *lg* is that, taking the sections in the order W, X, Y, Z, each sub-unit SU in each section has link groups connecting it to all of the (three) sub-units in the next section, which means of course that each sub-unit in a section also has link groups connecting it to the sub-units in the preceding section: for instance sub-unit SU1 of section X has link groups *lg*1, *lgi* and *lgx* interconnecting it with sub-units SU1, SU$i$ and SU$x$ of section Y, and is also interconnected with sub-units SU1, SU$i$ and SU$x$ of section W of link groups *lg*1′, *lgi*′, *lgx*′. The basic number of link groups required for this scheme of interconnection will be seen to be $yx^2$ ($x$=number of sub-units per section and $y$=number of sections) or $4\times3^2=36$ for the numbers of sub-units and sections chosen for FIG. 4. For four sections of five sub-units each according to the figures used for the previous specific example relating to a 5,000 exchange, this basic number of link groups would be 100. It will be observed that between any two units (each as constituted by corresponding sub-units from the several sections taken together) there are two interconnecting link groups between each pair of adjacent sections, giving a total for four sections of eight such link groups between any two such units. There is therefore a corresponding number of possible communication paths between any line served by the one unit and any line served by the other unit. By way of example the (eight) link groups which afford connection in this way between the unit constituted by the sub-units SU$i$ together and that constituted by the sub-units SU$x$ together have been marked with a cross in FIG. 4.

In addition to the link groups affording interconnection between each section and the adjacent section in the order W, X, Y, Z, other link groups may be provided which afford interconnection on a limited scale also between non-adjacent sections. This provision of additional link groups is represented in FIG. 4 by the lines *lgo*.

Reverting to FIG. 1, in the particular arrangement of the A rank switching arrays there shown, each line sub-group *lsg* has access into each of the several sections W, X, Y, Z over a single connection such as W1, X1, Y1 or Z1 as the case may be. Therefore each line sub-group has access to the B rank of switching arrays over only four connections, so that only four lines of the sub-group can be involved in calls at any one time. To increase the availability of the connections into the sections, the A switching rank may be modified according to FIG. 5(*a*) which illustrates this modification in respect of a typical switching group G serving $m$ line sub-groups and in this respect corresponding to a group such as G1 or G$n$ in FIG. 1. The modified arrangement of FIG. 5(*a*) provides in general that whereas each line of a sub-group *lsg* still has access into the four sections over four separate connections, the line no longer shares all of these four connections with the lines in the same sub-group but instead shares only some of these connections (namely the W and X connections as shown) with the other lines of its sub-group and shares the other connections (the Y and Z connections) with lines from other sub-groups. More particularly each of the A rank switching arrays A1 . . . A$m$ in FIG. 1 may be replaced by two arrays such as A1($wx$) and A1($yz$), or A$m$($wx$) and A$m$($yz$), by each of which certain of the lines served by the group are given access to two of the sections; thus the A1($wx$) . . . A$m$($wx$) arrays give access to sections W and X over respective ones of the connections W1 . . . W$m$ and X1 . . . X$m$, while the A1($yz$) . . . A$m$($yz$) arrays give access to sections Y and Z over respective ones of the connections Y1 . . . Y$m$ and Z1 . . . Z$m$. The connections of the lines to these A rank switching arrays is such that whereas each of the arrays A1($wx$) . . . A$m$($wx$) serves lines that are all in the same sub-group *lsg*, each of the arrays A1($yz$) . . . A$m$($yz$) serves lines which are taken one each from, and are correspondingly located in, the several line groups.

The same effect can be obtained by the organisation shown in FIG. 5(*b*) for a typical group G′ serving $m$ line sub-groups. Here the W and X connections extending into sections W and X are arranged matrix-wise with the Y and Z connections extending into sections Y and Z, and each line of the line groups *lsg* is connected to a diagonal connection which crosses a pair of the W and X connections and a pair of the Y and Z connections near their intersection, cross-point switching means being provided at each cross-point between this diagonal connection and the W, X, Y and Z connections which it crosses. FIG. 5(*b*) has been included because although it represents an arrangement which is functionally the same as that of FIG. 5(*a*), it may be found more convenient for the actual physical layout of a practical arrangement to conform more closely to FIG. 5(*b*) than to FIG. 5(*a*).

With the arrangement of FIG. 5(*a*) or 5(*b*), each line group has access to the B rank of switching arrays over one pair of the W and X connections (for example connections W1 and X1) and also over all of the Y and Z connections Y1 . . . Y*m* and Z1 . . . Z*m*. Therefore all the lines in a sub-group *lsg* can be involved in calls at any one time, provided only that sufficient of the pertinent W, X, Y and Z connections are not in use by lines which belong to the other line sub-groups served by the same switching group G or G'.

It should be noted that in re-organising the A-rank as described, the number of line sub-groups served by a single group of A switching arrays being preferably equal to the number of lines in a sub-group so that a "square" interconnection is obtained as in FIG. 5(*b*), the re-organisation is independent of, and does not influence, the size of the switching arrays in the B rank.

The particular overall organisation described with respect to FIGS. 1 and 2 for the interconnection of the switching ranks A, B and C, whether or not the A rank is modified according to FIG. 5(*a*) or 5(*b*), is particularly advantageous in regard to the identification of a route through a section between a calling or called line on the one hand and a link group which, on the other hand, affords connection towards a sub-unit serving the called or calling line (respectively) in another section. In this connection it will be noted that not only has each line access into a switching section over only one connection, but that this connection goes to a particular horizontal connection of a particular B rank switching array in a particular sub-unit. Also all the vertical connections for this particular B array go to corresponding horizontal connections in the several C arrays. Furthermore all the link paths in any link group are connected to corresponding vertical connections on the several C arrays. Thus given in respect of any call the locations on the exchange of the calling and called lines, it is possible without involving any selecting action, to identify and to ascertain the busy or free condition of such routes as extend through each section, via one or more of the C arrays in the relevant sub-units, from the calling and called lines to appropriate link groups. There then only remains to be chosen a particular link path from each such link group and this inherently determines a particular C array.

Having now described a preferred organisation of the trunking of an exchange switching system embodying the invention, further consideration will be given to the determination and selection of a particular path firstly from a calling line to a register and then from the calling line to the called line. This can best be dealt with by considering, with reference to FIGS. 6–11, the sequence of actions taking place in establishing a normal call in a particular exchange embodying the invention.

As previously indicated, FIGS. 6–11 employ symbols which indicate the logical function that is performed by the circuit parts which they represent, suitable details for the circuitry of these parts being well known to those skilled in electronic techniques for telephone exchanges, computers and other such fields. For instance, gating circuits are represented by a circle circumscribing a numeral. The numeral 1 indicates an isolating gate, for instance a rectifier gate, which gives an output in response to an input on any one of a plurality of input leads, whereas a higher numeral indicates a coincidence gate which gives an output in response to coincident inputs on that number of input leads. A lead terminated at a gate symbol by a small circle is an inhibiting lead, a signal on which will prevent the production of an output by the gate irrespective of the other inputs thereto. The coincidence gates may be resistance-rectifier gates or pulse-plus-bias gates, the latter being preferred especially where it is desirable to be able to time the opening of the gate in relation to other actions within the overall circuit: this can be done by assuring that the pulse applied to the gate occurs at an appropriate time. A simple pulse-plus-bias gate comprises a bias input lead and a pulse input lead connected to a common point through a resistance and a capacitor respectively, and an output lead connected to the common point through a rectifier which is poled to pass an input pulse but which in the gate-closed condition is reverse-biased to block such pulse.

Bistable circuits are represented by a small rectangle divided into two halves respectively containing the numerals 0 (quiescent condition) and 1 (actuated condition). A signal on the input lead shown connected to the "1" half changes the circuit to its actuated condition and produces a signal on the output lead shown connected to the same half. Many forms of bistale circuit, for instance cross-connected transistor pairs, are well known. No attempt has been made to indicate the restoration of the bistable circuits to their quiescent state: this can easily be done by a resulting setting generated and applied to them at an appropriate time.

Other circuit parts represented only in logical form will be referred to later. It is to be noted that in several places at which a considerable number of corresponding circuit elements are required, especially gates and marking leads, only one or two of these elements have been represented as typical.

At the top of FIG. 6 is represented a typical subscriber's line circuit LC of which only those elements necessary for an understanding of the ensuing description have been shown. When the subscriber calls by looping the + and − (speech) wires of his line, a lead *cl*, which is normally held at a negative potential through a resistance R1, is marked with a calling (earth) potential by connection to earth over the line loop (not shown) via normally closed contacts *k*1 and *k*2 of a cut-off relay K. When connection is subsequently established between a calling line and a register via the cross-point switching arrays, the cut-off relay K is operated by earth potential applied as is common practice, to a P-wire individually associated with the line, thereby disconnecting the earth potential and the resistance RS' from the line wires.

When a line calls, a calling line detection and identification circuit GLI detects its calling condition and provides, on sets of output leads U*g*, G*g*, S*g*, L*g* extending from it, digital markings which identify the unit in the A switching rank (one-out-of-*x* on leads U*gl* . . . U*gx*), the group in the unit (one-out-of-*n* on leads G*gl* . . . G*gn*), and the line sub-group in the group (one-out-of-*m* on leads S*gl* . . . S*gm*) to which the calling line is connected, and also the particular line in the sub-group (one-out-of-ten on leads L*g*1 . . . L*g*10 for ten-line sub-groups). These will be called the unit, group, sub-group and line markings respectively. They together represent an exchange position number of the line and need not correspond to its directory number. The suffix *g*, denoted calling: the suffix *d*, used later, denotes called.

In the contemplation that, in an exchange embodying the invention, the co-ordinate switching arrays would preferably have their cross-point switching means constituted by reed relays, the calling line detection and identification circuits would preferably take a form employing static electric or electronic devices so as not to nullify the advantages of the high speed operation afforded by such reed relays. It is convenient also to mention here that circuits for fulfilling the other functions which will be referred to later may likewise employ static electric or electronic devices or, where some selective switching or coupling action is required may employ further reed relays or electronic switches. Exceptionally, ordinary relays may be used if so desired in situations where their slower speed of operation would not be prejudicial to the overall speed of operation, as for instance where a particular connection or condition can be set up a relatively long time before that condition or connection is utilized.

Various suitable forms of circuit for calling line detection and identification are already known or can easily be devised by those skilled in the art. Purely by way of example, the circuit GLI has been assumed to include for each line unit a line scanner, typified by LS, which sequentially scans all the lines in its unit and is stopped in its scanning action on reaching a calling line, the identity of which within its unit can then be derived as a function of the stopped position of the line scanner. The line scanners of the several units are themselves scanned by a unit scanner US which, on reaching a line scanner that has been stopped, is itself stopped to identify the unit of the calling line. More specifically the circuit GLI has been indicated as including cascade-connected multi-stage counting or stepping circuits CL, CS and CG as the line scanner LS for each unit, these circuits being driven by a pulse generator PG1, and a multi-stage counting or stepping circuit CU driven by a pulse generator PG2 and constituting the unit scanner US. Each of these counting or stepping circuits has a set of output leads (CL1–CL10, CS1 . . . CS*m*, CG1 . . . CG*n*, CU1 . . . CU*x*) which the circuit marks in turn on successive steps. If *m, n* and *x* are each ten, these circuits can each be some form of decimal (ten-stage) counter capable of producing a marking on an output lead from each stage, or can be some form of binary counter with output conversion to a decimal basis on the final output leads. The markings on leads CL1 . . . CL10 are in effect used to scan all the lines in each subgroup, those on leads CS1 . . . CS*m* to scan all the subgroups in each group, and those on leads CG1 . . . CG*n* to scan all the groups in the relevant unit. To this end, at gates such as that typified by GT1 the marking on each of the leads CL1 . . . CL10 is gated individually with the markings on the leads CS1 . . . CS*n* to give from each such gate an output marking which is unique to a particular line within a particular subgroup. To ensure that the markings have first become properly established on leads CL1 . . . CL10 and CS1 . . . CS*m*, the receipt at the GT1 gates of the CL1 . . . CL10 markings is delayed at a gate GT2 which is opened by the receipt from the pulse generator PG1 of a pulse delayed, which has been delayed by about half a pulse period in a delay element LL. A line gate such as GT3 provided in respect of each line receiver as inputs thereto the marking potential produced on lead *cl* when the line is calling and the output marking from the relevant gate such as GT1, namely the GT1 gate whose output marking corresponds to the relevant subgroup and line within the subgroup. The output lead of those line gates, such as GT3, which relate to lines within the same group are taken in common to a gate such as GT4 (one per group per unit) and there gated with the output marking on the relevant one of leads CG1 . . . CG*n*. If a line is calling within the relevant group, gate GT4 will produce an output signal which actuates a bistable element BS1 and causes it to inhibit at gate GT5, the application of the driving pulses for circuits CL, CS and CG, which therefore stop their scanning of the lines within the pertinent unit. The bistable element BS1 also marks a lead R′ (to indicate that the services of a register are required) and in addition primes a gate GT6 individual to the line scanner LS and therefore to the pertinent line unit, there being one gate such as GT6 per unit: the gate for another unit is indicated at GT6′. With this scanning stopped, the particular leads which are left marked in the sets CG1 . . . CG*n*, CS1 . . . CS*m* and CL1 . . . CL10 identify the calling lines group, sub-group and line within the sub-group.

The markings on leads CU1 . . . CU*x* of the circuit CU in the unit scanner US are applied respectively and successively to the several gates such as GT6, and when such a gate is found already primed (indicating that the associated line scanner has been stopped by a calling line) it produces an output signal which actuates a bistable element BS2. This stops the scanning action of the unit scanner US by inhibiting the driving pulses for circuit CU at gate GT7. It also opens a set of gates GT8 to extend the marking on lead R′ on to a lead R and also to apply to the sets of leads L*g*1 . . . L*g*10, S*g*1 . . . S*gm* and G*g*1 . . . G*gn* the line, sub-group and group markings which in conjunction with the unit marking applied to one of the leads U*g*1 . . . U*gx* by the stopped unit scanner, identify the calling line.

Figure 7:
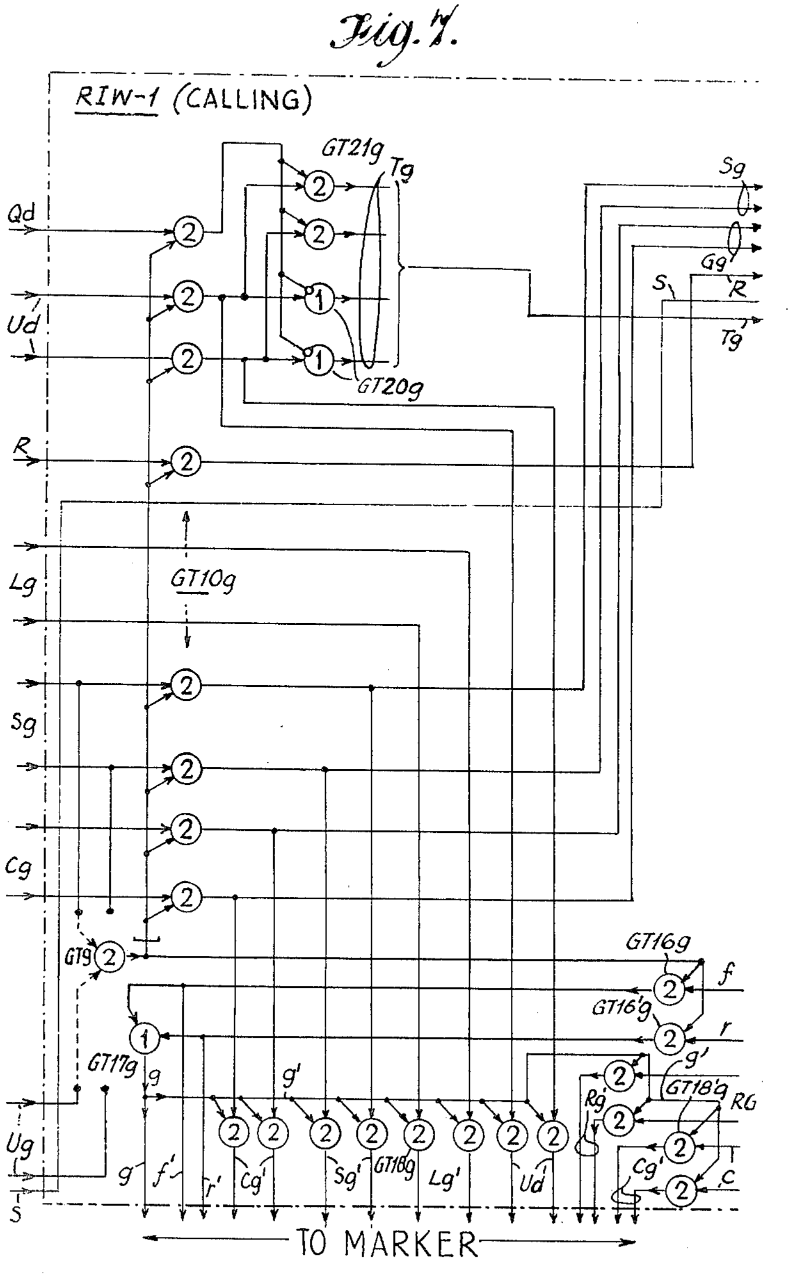
Figure 8:
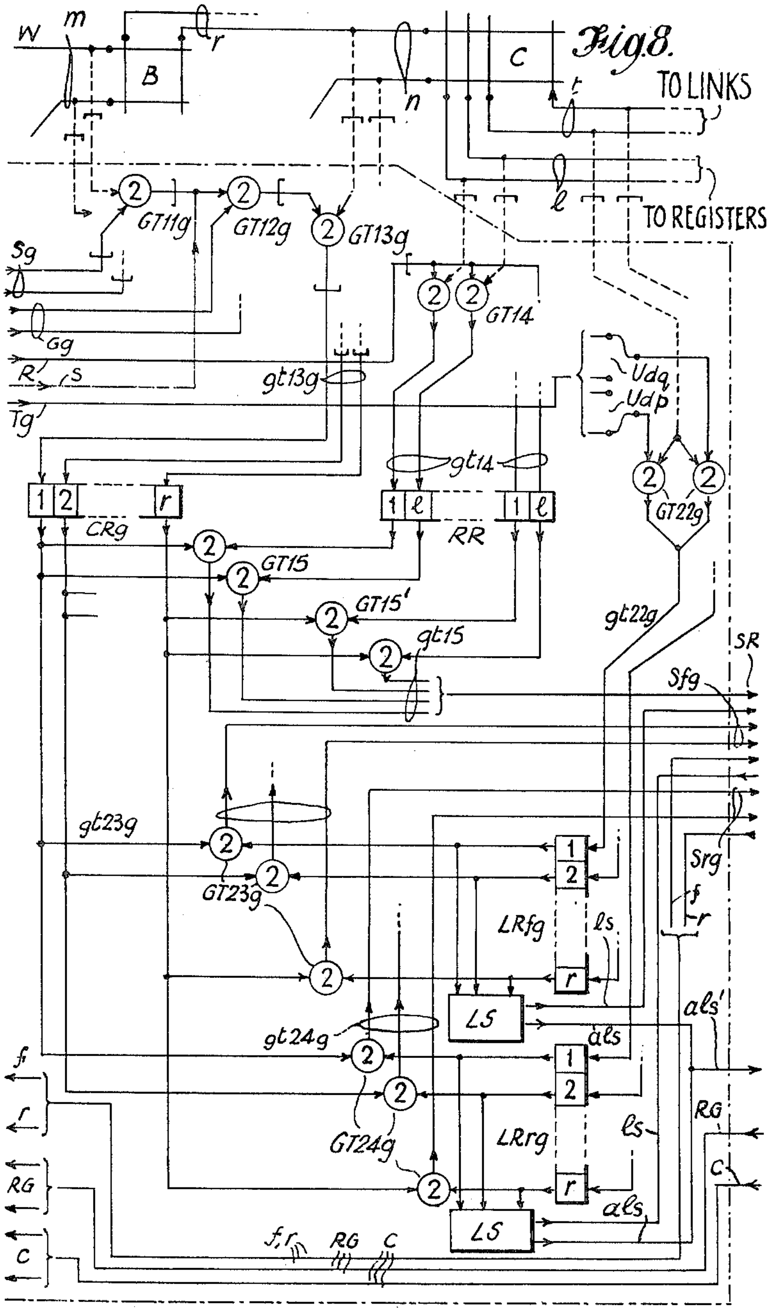

The line identifying markings from the circuit GLI are fed into calling-side route identifying circuits which are respectively, and individually associated with the several switching sections. These route identifying circuits can conveniently be considered as each including, in respect of each switching sub-unit of the relevant section, a sub-circuit by which in the sub-unit serving the calling line, the route through it towards the registers, and subsequently towards the links which can give access to a called line, can be identified and its busy or free condition ascertained. Such a sub-circuit for the sub-unit (SU1) serving the calling line in section W is illustrated in FIGS. 7 and 8 within the chain-dotted box, RIW–1 (calling).

With the particular trunking arrangements described with respect to FIGS. 1 and 2, the lines connected to certain of the A rank switching arrays (for example the A1 arrays) in any particular unit of the A rank are all served by the same sub-unit in the several sections, whereas the lines connected to the other A rank switching arrays (for example the A*m* arrays) are served by different sub-units in the several sections, as has already been described. The lines in question will be referred to as P-lines in the first case and as Q-lines in the second case: whether a line is a P-line or a Q-line therefore depends on the A rank switching array to which it is connected (as identified by the sub-group marking), and this in conjunction with the particular unit to which the line is connected in the A rank, determines the sub-unit which serves the line in any particular section.

For each sub-unit in each section, the relevant sub-circuit such as RIW–1 includes gates such as GT9 (FIG. 7) each of which has its input leads connected to one of the unit marking leads U*g* and one of the sub-group marking leads S*g* from the circuit GLI, these connections being so chosen that if the unit and sub-group markings of a calling line indicate that it is served by this sub-unit, a gate such as GT9 produces an output signal by which the sub circuit in question is rendered active, and is caused to accept, via a set of gates GT10, the sub-group and group markings and the marking on lead R. Later, when it comes to identifying a route towards a called line rather than towards a register the active sub-circuit such as RIW–1 will also accept certain information about the called line on leads U*d* and Q. Using the group and sub-group markings on leads G*g* and S*g*, the route identifying sub-circuit such as RIW–1 ascertains by interrogation, by means of gates such as GT11 and GT12 (FIG. 8), the free or busy condition of the relevant W, X, Y or Z connection (see FIG. 1) over which the calling line has access to the sub-unit in question via the A switching rank. If this connection, which corresponds to a particular horizontal connection in a particular B array, is found to be free, the route identifying sub-circuit then ascertains the free or busy conditions of the vertical connections of that B array, by interrogation by means of gates such as GT13. For the purposes of illustration it has been assumed that each of these latter gates has an interrogating input lead which is connected to the output lead of that GT12 gate which relates to the particular B array concerned, as identified by the group marking. In practice, however the interrogation of the gates such as GT12 may be effected separately by the group markings, dependent on the relevant connection (W) into the appropriate A array having first been found to be free. The pattern of markings obtained on output leads *gt*13 from the interrogated GT13 gates which relate to free vertical connections on the relevant B array in the sub-unit are stored in a storage arrangement CR comprising for instance a number of bistable storage elements equal to the number of such vertical connections in each B array, this number being equal, as previously discussed, to the number ($r$) of C arrays for sub-unit. As each vertical connection of each B array goes to a different C array, their stored pattern of markings indicates which of the C arrays in the sub-unit are available for use.

Dependent on the presence of the marking on lead R, the route identifying sub-circuit such as RIW–1 also ascertaining the free or busy conditions of all the registers connected to the C arrays of the sub-units, doing so by interrogating, by means of gates such as GT14, the $l$ register connections (compare FIG. 1) which extend from these C arrays. The pattern of markings obtained on the output leads *gt*14 from the gates such as GT14, indicates which of the registers are available for use and is stored in a storage arrangement RR which, like store CR may comprise an appropriate number ($l \times r$) of bistable storage elements. The markings stored in the two storage arrangements CR and RR are compared by means of gates such as GT15, GT15′ to ascertain which of the available C arrays (store CR) has connected to it an available register (store RR), this being indicated by a pattern of markings produced by the gates such as GT15, GT15′ on a set of output leads *gt*15.

The markings on leads *gt*15, and markings of like significance on corresponding sets of leads from the route identifying sub-circuits associated with the sub-units serving the calling line in the other section are passed (FIG. 9) into a selection and comparison circuit SCC which dependent on the relative conditions in the several sections (for instance on the occupancy of the register connections in the C arrays) selects one of the registers which are indicated by these markings as being free and connected to an available suitable C array. A possible form for the circuit SCC is given in FIG. 13 and the manner in which it performs its selection will be considered later with reference to that figure. The selected register is identified by the circuit SCC by a marking on a set of output leads C, which identifies the C array to which the register is connected, in conjunction with a marking on a set of output leads RG which identifies the particular register on that C array and therefore the relevant vertical connection in it. These markings are passed to all the calling-side route identifying sub-circuits such as RIW–1. They are also passed over sets of leads RG′ and C′ to a register identifying circuit RIC which by simple cross-gating (not shown) between these sets of leads, marks the relevant one of a set of leads RS which extend individually to the several registers. This marking prepares the selected register for receiving digits identifying a called line and also causes the opening in the register of a set of gates (not shown) via which the register accepts and registers, over leads U*g*″, G*g*″, S*g*″ and L*g*″ (FIG. 6), the unit, group, sub-group and line markings which identify the calling line.

The circuit SCC also marks, according to the switching section to which the selected register is connected, a lead such as *fr* which leads via lead *f* to all the calling side route identifying sub-circuits of that section. In the active sub-circuit such as RIW–1, this marking is accepted at gate GT16 and opens, via a gate GT17 and leads *g* and *g*′, a set of gates GT18. These gates pass to a marker (of which there is assumed to be one for each sub-unit in each section) the following information denoted by appropriate markings on the relevant sets of leads: on leads G*g*′, S*g*′ and L*g*′ identity of the calling line in terms of its group, sub-group, and line in the sub-group, no information as to the unit of the line being required because the marker is individual to the relevant sub-unit; on leads C′ the identity in the sub-unit of the C switching array to which the selected register is connected; and on leads RG′ the identity of the vertical connection to which that register is connected in that C array. The marking accepted from lead *f* is extended to the marker over lead *f*′ as an initiating signal, and the marker also receives the marking on lead *g* to indicate that it is a calling line to which the marker is required to establish a connection.

It will be recalled that the group marking (on leads G*g*′) determines the relevant B array in the sub-unit which the marker serves and therefore determines the relevant horizontal connection of the C array, that the sub-group marking (on leads S*g*′) determines the relevant A array and therefore the relevant horizontal connection in the B array, and that the line marking (on leads L*g*′) determines the relevant vertical connection in the A array. It will be seen therefore that the marker has sufficient information to establish a path from the calling line to the selected register and does so by causing operation of the switching means at the appropriate cross-points in the relevant A, B and C switching arrays. A register path from the line LM (assumed to be the calling line) is shown in heavy dotted lines in FIG. 1, it being assumed that section W has been selected to provide this path in preference to the other sections. Various forms of marker are already well known in the cross-point and cross-bar telephone switching art and any suitable form may be used in the present instance. A preferred form is illustrated in FIG. 12 which will be described later. After the establishment of the register path, the register receives and registers from the calling line, in a manner that can conform to known practice, a digital identification of the called line. The calling line is at this stage held busy by the register by the application to the lines P-wire of a busy (earth) potential. As a result of this potential, the line's cut-off relay K (FIG. 6) is operated and opens its contacts *k*1 and K2 thereby removing the calling potential on lead *cl*. This closes gate GT3 and causes GT4 to remove its output signal from element BS1, which is then restored to its quiescent condition, permitting the line and unit scanners to restart and removing the marking from lead R.

For an ordinary local call to a line whose directory number corresponds to its position on the A switching rank, the registered digits may directly identify the location of the called line in terms of its unit, group, sub-group and line in the sub-group, provided that the radices of the several digits are suitable: for instance the usual decimal radix would be suitable if the switching quantities previously referred to, that is $x$, $n$, $m$ and the number of lines per sub-group, were also decimal. Failing this, provision can readily be made for converting the combination of registered called line digits into a new combination the constituent digits of which have more appropriate radices: for instance if for a 6,000 line exchange there were five switching units ($x=5$) of 1,200 lines each, with 15 lines per sub-group, 8 sub-groups per group ($m=8$) and 10 groups per unit ($n=10$), then digits having radices of 5, 10, 8 and 15 respectively would be appropriate. The conversion may be achieved for instance by setting a counter to the complement, with respect to its capacity, of the number represented by the combination of registered digits and then counting out this counter by pulses which are also fed into another counter having four cascaded stages of which the counting capacities are 15, 8, 10 and 5 respectively, the conversion digits being obtained as markings provided by the several stages according to their final settings.

For certain other calls there may be provided, as in the system described in our said earlier application, translation facilities which, in dependence on at least some of the registered digits, provides a digital translation identifying the location of the called line on the A switching rank, this being the location (exchange position) of the called line itself in the case of a call to a local line, or being the location of a relevant outgoing junction in the case of a call to a non-local line. Such translation, which may be provided by a translator serving a number of registers in common on a one-at-a-time basis, may be provided for instance in the case of a call over an outgoing junction or in the case of a local call to a line whose location on the exchange has been changed without a corresponding change of its directory number. Additionally, in the case of a call to a P.B.X line the translator may ascertain the fact and in conjunction with an associated P.B.X selection circuit cause the selection of a free one of the called P.B.X lines and provide a digital translation identifying this particular line in terms of its location. In all cases the digital translation may be obtained directly in the form of digit markings respectively identifying in respect of the called line location the relevant A rank unit, group, sub-group and line in the group.

The translator may also provide other information—for example, indication whether the line is a P-line or a Q-line as previously referred to, and class-of-service or other information about facilities available to the line—not only in respect of a called line but also in respect of a calling line. In the latter respect, the identity of the calling line could be passed first to the translator and later transferred from there to the register serving the call, instead of being passed directly to the register as previously assumed. For an outgoing junction call, the translator may additionally provide in accordance with the more usual function of a translator, routing digits which will subsequently be sent out over the outgoing junction.

Figure 10:
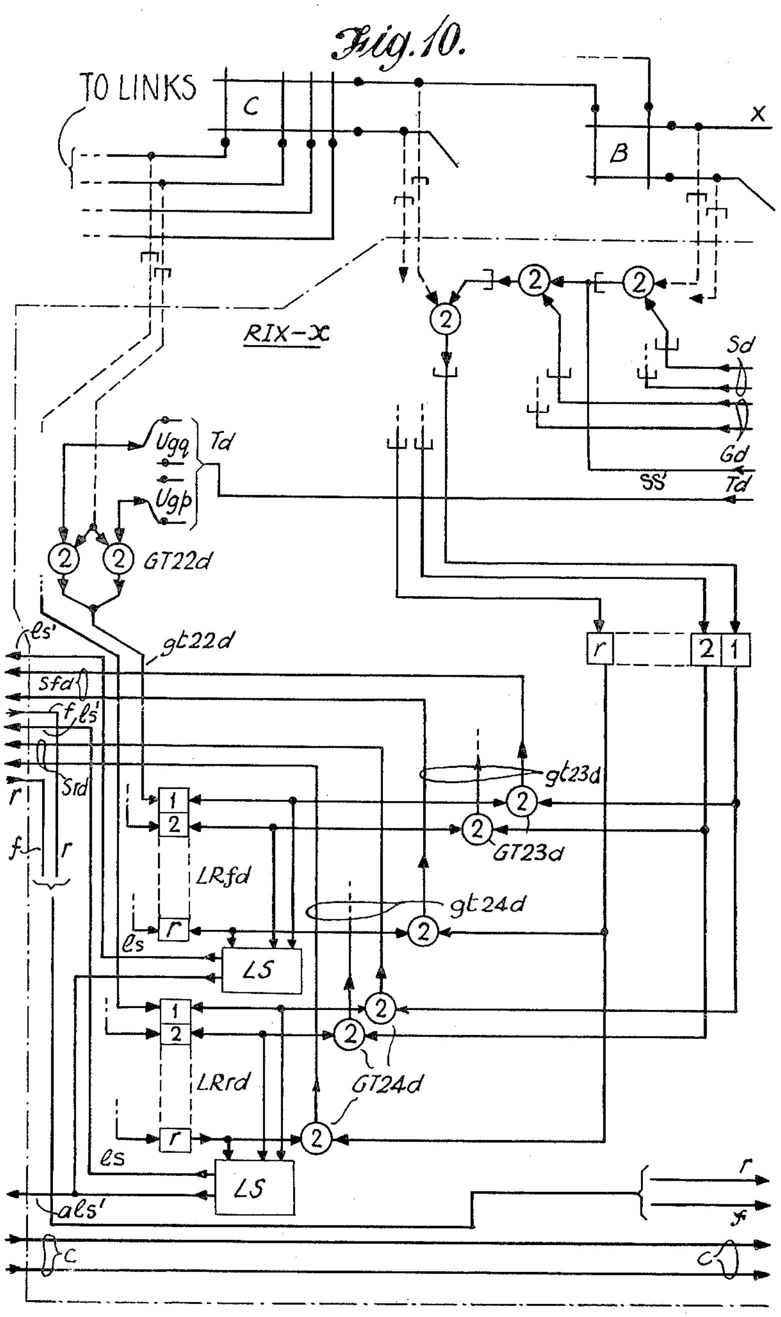
Figure 11:
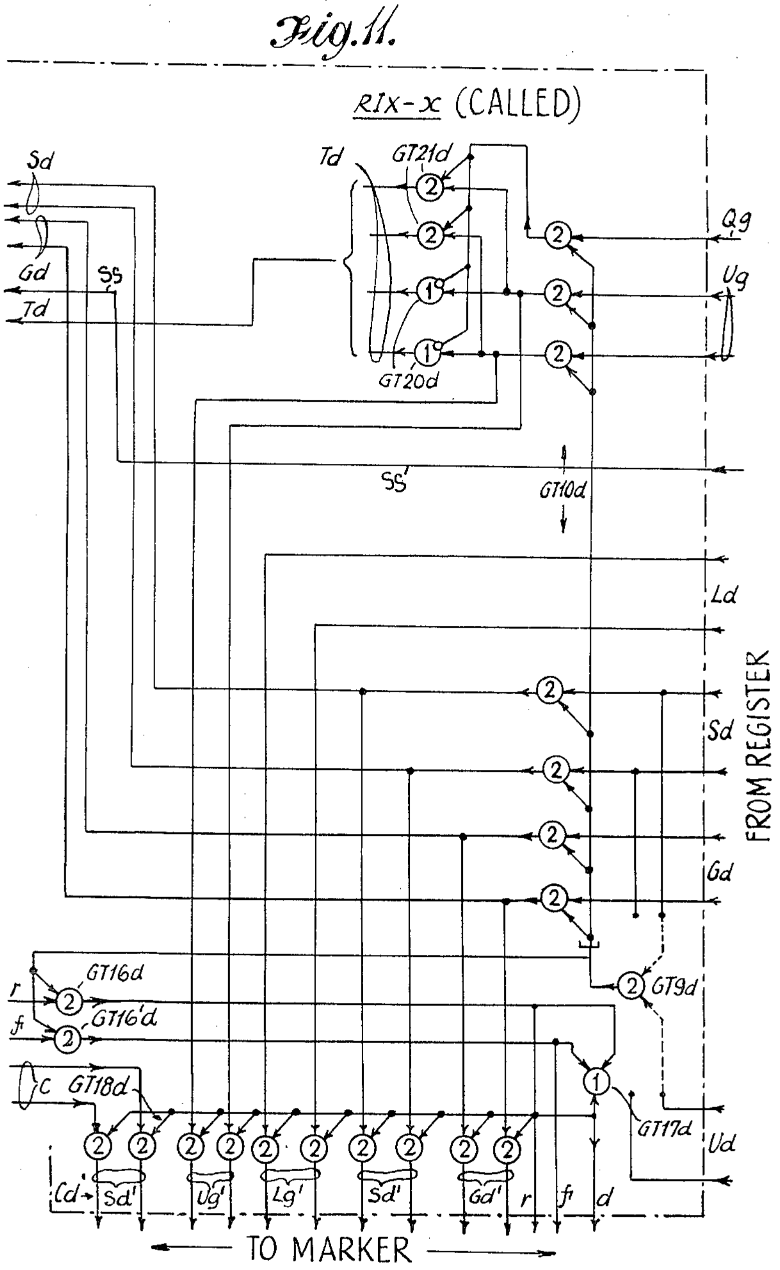

The called line's unit, group, sub-group and line markings, obtained either directly from the register or indirectly from it via a conversion circuit or translator as aforesaid, are presented to called side route identifying circuits respectively and individually associated with the several switching sections (W, X, Y and Z). Like the calling side route identifying circuits, each called side route identifying circuit can conveniently be considered as including, in respect of each switching sub-unit of the relevant section, a sub-circuit by which, in the sub-unit serving the called line, the route through it towards the links which can give access to the calling line can be identified and its busy or free condition ascertained. Such a called side route identifying sub-circuit for the sub-unit (SU*x*) serving the called line in Section X is illustrated in FIGS. 10 and 11 with the chain-dotted box RIX–*x* (called). The calling and called side sub-circuits such as RIW–1 (FIGS. 7 and 8) and RIX–*x* (FIGS. 10 and 11) are virtually identical, except that the latter does not contain the circuit elements which in the former are used exclusively in connection with the determination of a route to a register. To show the correspondence, the circuit elements in FIGS. 10 and 11 have been arranged, as drawn, as a mirror image of the corresponding elements in FIGS. 7 and 8, using the same reference characters but with the suffix *d* instead of *g*.

The called side sub-circuits are presented with the called line's unit, group, sub-group and line markings on sets of leads U*d*, G*d*, S*d* and L*d* (right hand side of FIG. 11). The calling side sub-circuits, which may in the meantime, have been used in connection with another call, are presented on leads U*g*, G*g*, S*g* and L*g* with unit, group, sub-group and line markings identifying the calling line, these markings being presented by the register over leads U*g*″, G*g*″, S*g*″ and L*g*″ (bottom of FIG. 6). For a purpose which will be apparent later, the calling side sub-circuits are also presented with the unit marking of the called line on leads U*d*, together with a marking on a lead Q*d* if the called line is a Q-line as previously referred to. This latter marking, which is not presented if the called line is a P-line, can be derived in the register (or translator) according to the sub-group marking of the called line, it being recalled that a line's sub-group determines whether it is a P-line or a Q-line. In a like manner and for like purpose, the called side route identifying sub-circuits are also presented with the calling line's unit marking on leads U*g*, and with a marking on lead Q*g* if the calling line is a Q-line but not if it is a P-line.

By means of the gates such as GT9, in the manner previously described, those of the calling and called side sub-circuits (such as RIW–1 and RIX–*x*) which are associated with the sub-units respectively serving the calling and called lines in each switching section, are rendered active and accept at gates such as GT10 (FIG. 7 or FIG. 11) the markings presented to them. By means of the interrogating gates such as GT11, GT12 and GT13 (FIG. 8 or FIG. 10), also in the manner previously described, each of the sub-circuits thus rendered active, ascertains the free or busy condition of the relevant W, X, Y or Z connection from the A route into its sub-unit, and also ascertains if this connection is free, the free or busy conditions of the vertical connections in the B array to which that connection intends, these conditions being indicated by the pattern of markings obtained on the output leads *gt*13 of the gates such as GT13. Depending on the method of interrogation it may have to be arranged that the calling and called side route identifying circuits for each section perform these functions one after the other. As the vertical connections on the B array go separately to the several C arrays, the markings last referred to also indicate which of the C arrays are available for the call in that the relevant horizontal connection therein is free. These markings are stored in the storage arrangement CR as previously described.

Assuming that the trunking arrangements are as described with reference to FIGS. 1, 2 and 4, each sub-unit in any section can be connected to any one of the several sub-units in each of the adjacent sections over respective link groups, the links in each of which are connected to corresponding vertical connections respectively included in the several C switching arrays of the sub unit. Each link group, and therefore each of the vertical connections to which links are connected in the C arrays can therefore be identified in terms of the sub-units to which the links extend in the other sections.

In the case of a call from or to a P-line, the lines unit marking (on leads U*g* or U*d*) can identify the sub-units which serve the line in the several switching sections. In the case of a call from or to a Q-line, the line's unit marking can again identify the sub-units which serve the line, but the identity denoted by any particular unit marking is different from that in the case of a P-line. For instance considering FIG. 3, the unit marking (1) of a P-line in unit U1 can also identify sub-unit SU1 as serving that line in each of the sections W, X, Y and Z, whereas the same unit marking (1) for a Q-line in unit U1, would identify as serving the line the sub-units SU1 in section W, SU2 in section X, SU3 in section Y, and SU4 in section Z. Because of this, the unit marking of the called line as accepted by a calling side sub-circuit such as RIW–1 is passed via gates GT20*g* and leads T*g* to a set of marking terminals U*dp* (FIG. 8) in the case of a called P-line, but is passed via gates GT21*g* (opened by the marking on lead Q*d*, which also inhibits gates GT20) to another set of marking terminals U*dq* in the case of a called Q-line.

In the called side sub-circuits such as RIX–*x*, the gates GT20 *d* and GT21*d* (FIG. 11) serve the same function in respect of the calling line's unit marking on leads U*g* and the terminal sets U*gp* and U*gq*.

The marking appearing at one of the terminals U*dp* or U*dq* in the active calling side sub-circuit such as RIW–1 for each section, and likewise the marking appearing at one of the terminals *Ugp* or *Ugq* in the active called side sub-circuit such as RIX–*x* for each section is used to interrogate, by means of pairs of gates such as GT22, the free or busy conditions of those links which, subject to availability, could give access to the called or calling line (as the case may be) via the relevant sub-units in other sections. This would include ordinary cross-links, and also, where provided, links in overlying link groups such as these referred to previously in connection with FIG. 4.

In the active route identifying sub-circuits for each section, a storage arrangement LR*f* stores the pattern of markings obtained on the output leads such as *gt*22 of those pairs of gates such as GT22 which relate to respective links in the appropriate link group extending towards one of the adjacent sections. A storage arrangement LR*r* serves the same purpose in respect of the links of the appropriate link group extending to the other adjacent section. For convenience of reference, link groups which go from one section to the next section in alphabetical order (or from the last section to the first) will be considered as being forward (*f*) link groups in respect of that one section, while those which go to the alphabetically preceding section (or from the first section to the last) will be considered as reverse (*r*) groups. It will be appreciated that each link group will be "forward" with respect to one of the two sections which it links, and "reverse" with respect to the other.

Where there is an overlying link group (such as *lge*, FIG. 4) which can serve the call by linking between other combinations of sections, the free or busy conditions of the links in such group are also interrogated in gates such as GT22 (on both the calling and called side) and the resultant output markings are stored in another storage arrangement (not shown) corresponding to LR*f* and LR*r*.

In each active calling side route identifying sub-circuit such as RIW–1, the markings stored in store CR*g* and those in store LR*fg* are compared in a set of gates such as GT23*g*, which produce on their output loads *gt*23*g* a pattern of markings indicative of each of those links which is free in the appropriate forward link group (store LR*fg*) and for which the C array to which it is connected on the calling side is available for establishing the call (store CR*g*). Likewise a set of gates such as GT24*g* produces on output leads *gt*24*g*, a pattern of markings having the same significance with respect to the appropriate reverse link group. A further set of gates (not shown) would produce on their output leads a pattern of markings having the same significance with respect to the or each appropriate overlying link groups, these output leads extending from the sub circuit as a further set (not shown).

In like manner, by means of gates such as GT23*d* and GT24*d*, there is obtained from each active called side route identifying sub-circuit such as RIX–*x*, on sets of leads such as *gt*23*d* and *gt*24*d*, patterns of markings indicative of each of those links which is free in the appropriate forward or reverse link group (store LR*fd* or LR*rd*) and for which the C array to which it is connected as the called side is available for establishing the call (store CR*d*).

The leads such as *gt*23*g* and *gt*24*g* from the several sub-circuits such as RIW–1 of the calling side route identifying circuit of each section are commoned on to respective sets of output marking connections such as S*fg* and S*rg*. (This is possible as only one of these sub-circuits in active at a time.) Likewise the leads such as *gt*23*d* and *gt*24*d* from the several sub circuits of the called side route identifying circuit of each section are commoned to sets of output marking connections such as S*fd* and S*rd*. (It may be noted here that the lead such as *gt*15 which are marked according to register availability in the several sub circuits of the calling-side route identifying circuit of each section are similarly commoned on to a set of leads SR, represented by a single line in FIG. 8.)

Each route identifying circuit (calling side or called side) therefore has a number of sets of output marking connections such as S*f* and S*r* each containing a number of connections corresponding to the number of link paths in a link group. Each set relates to the link groups which interconnect the route identifying circuit's own section with a particular one of the other sections: for instance the set of output marking connections S*fg* of calling side route identifying circuit for section W relates to the link groups which go from this section to section X, the set S*rg* relates to the link groups to section Z, and another set (not shown) would relate to the overlying link groups, such as *lgo,* going to any other section. Likewise the set of marking connections S*fd* of the called side route identifying circuit of section X relates to the link groups which go from this section to section Y, and the set S*rd* relates to the link groups to section W. Each set may therefore be considered as relating to a particular pair of sections, namely those interconnected by the link groups to which the set relates, and is marked by its route identifying circuit to indicate in respect of the link group which extends between the relevant sub-units in the sections to which the set relates, which of the link paths of the group are free and have available routes to them through the route identifying circuit's own section.

It is now necessary to ascertain which of the free link paths in each relevant group have available routes to them on both the calling and called sides and can therefore afford a through-path between the calling and called lines via the sections which they link. To this end, referring to FIG. 9 and considering any pair of sections interconnected by link groups, the sets of marking connections which relate to this pair of sections in the calling side route identifying circuit of one section of the pair and in the called side route identifying circuit of the other section, are taken to one of two link path determinators relating to this pair. The similarly corresponding sets of marking connections from the called side route identifying circuit of the first section of the pair and the calling side route identifying circuit of the other section are likewise taken to the other of these link path determinators. Such link path determinators, which as will be seen can comprise coincidence gating circuits of some suitable form, are represented in FIG. 9 by blocks identified by the reference LC, this reference having appended to it in brackets, the identification letters (W, X, Y and Z) of the pairs of sections to which the particular block relates. Of the two determinators relating to any one pair of sections, one pertains to the forward mode of the link groups linking these sections and the other to the reverse mode, as indicated by the order of the letters within the brackets. Thus for example from the calling side route identifier pertaining to section W and including sub-circuit RIW–I, and from the called side route identifier pertaining to section X and including sub-circuit RIX–*x*, the respective sets of leads S*fg* and S*rd,* which relate to one and the same pair of sections, namely W and X, and therefore to the same link groups between these sections, are taken to the link path determinator LC (W–X) as indicated by FIG. 9 when properly aligned with FIGS. 8 and 10. The other link path determinator LC (X–W) associated with this pair of sections has connected to it the sets of leads corresponding to S*rg* and S*fd* from the calling and called side route identifiers of sections W and X respectively.

Only link path determinators for adjacent sections have been represented in FIG. 9. For non-adjacent sections linked by overlying link groups, additional determinators would be provided.

In each link path determinator, the markings carried by corresponding connections in the two sets connected to it are compared in a set of coincidence gates such as GT25: if the connections of any corresponding pair are both marked to indicate a free condition of the link path to which they relate, the resultant output marking from the relevant gate, applied to the corresponding one of a set of output leads such as SL, indicates that the link path in question is free and has routes available through the switching arrays on both the calling and called sides, that is, to the calling and called lines.

All of the link path deteminators present their output markings, on their leads such as SL, to a comparison and selection circuit SCC represented in block form. The function of this circuit is to select, from the link paths which are indicated by these markings as being capable of serving the call, one which can do so with optimum advantage having regard to certain predetermined considerations as previously discussed. For instance, the selection may in general, but with possible exceptions as will be mentioned below, be based on a scheme of precedence of the C switching arrays within the individual sub-units, it being remembered that the several link paths constituting any link group are connected to different C arrays in each of the two sub-units (in different sections) which it links. The order of precedence is immaterial as regards the resultant tendency to reduce the chances of blocking subsequent calls, but the numerical order of the C arrays (1, 2 . . . *r*) will be assumed. Reverting to FIGS. 1 and 2 to give an example of the basis of selection, let it be assumed that the line LM (top left-hand corner of FIG. 1) is calling line LN (bottom left-hand corner). Line LM is connected to an A1 array in the A rank, and is therefore a P-line served by sub-unit SU1 in sections W and X (FIGS. 1 and 2), whereas line LN which is connected to an A*m* array, is a Q-line served by sub-unit SU*x* in section W (FIG. 1) and by sub-unit SU1 in section X (FIG. 2). Let it also be assumed that the actions of the relevant route identifying circuits and link path determinators have resulted in the presentation to the selection and comparison circuit SCC of markings identifying as possible link paths for the call those which are included in the through-paths traced through sections W and X in FIGS. 1 and 2 by the heavy full lines on the one hand and by the heavy chain-dotted lines on the other hand. (For the purpose of this illustration it has been further assumed that link group LG1 connected to the calling sub-unit SU in section W is the same link group as LG1 connected to the called sub-unit SU1 in section X, and that link group LG*t* connected to the calling sub-unit SU1 of section X is the same link group as LG*t* connected to the called sub-unit SU*x* in section W.) By its selection of a particular link path the circuit SCC in effect selects between these through paths and any others that are available through other sections and link groups. If the selection is on the basis of packing the calls according to the assumed order of precedence of the C arrays, the solid line path, involving C1 arrays, would be selected in preference to the chain-dotted path which involves C*r* arrays.

It is emphasised that in applying the present invention in practice, some other basis of selection may be adopted. For instance the selecting action may take into account the relative traffic densities in the several sections and/or link groups so as to tend to balance the traffic, any necessary information as to existing traffic conditions being additionally fed to the circuit SCC. However selection on the basis of tending to balance traffic, though desirable in order to reduce blocking due to limitations in the availability of the link groups, is not readily compatible with selection on the call packing basis already referred to. As a possible compromise, based on appreciation of the fact that the purpose of balancing traffic is to keep all routes open as long as possible, namely until a condition of pending congestion is reached, the call-packing basis of selection may be modified in that if selection on this basis would result in the last link path of a group being taken while another link group suitable for the call has two or more link paths available, then a link path of such other group is selected instead. In this way a traffic balance of one available link path per suitable link group is obtained when it is most needed, namely when congestion is pending. For this purpose, the output markings from each of the storage arrangements LR which store the link path busy or free conditions in each calling and called-side route identifying sub-circuit such as RIW–1 and RIX–*x*, are passed into a circuit arrangement LS (FIGS. 8 and 10) which, when the markings indicate that only one or none of the link paths of an interrogated group is free, produces on its output lead *ls* a marking indicative of the fact. Each of the circuits LS may for instance comprise a plurality of coincidence gates each having two input leads connected to respective ones of a pair of the store output marking leads such that in this manner each marking lead is paired with each other at a gate. If two or more of these leads have a free marking, one or more of the gates will produce an output signal, which can be used to mark a lead *als* and to inhibit or remove a marking, otherwise existing on a lead *ls*. The leads *ls* from corresponding LS circuit arrangements in the several sub-units such as RIW–1 or RIX–*x* of each route identifying circuit of each section are connected in common to a lead *ls'* in each case. Each lead *ls'* therefore relates to the link groups by which the section concerned is linked with another section, and the leads *ls'* pertaining to these two sections on the calling and called side are connected in common (as indicated in the link path determinator boxes LC (W–X) and LC (X–W) in FIG. 9) to a lead *ls''* which accompanies the leads SL extending into the circuit SCC. The leads *als'*, from all the circuits LC are connected in common to a lead *als'*, which extends into the circuit SCC and which, if marked, indicates to this circuit that at least one of the link groups concerned has two or more link paths available for the call. On the other hand a marking on a lead *ls''* indicates to the circuit SCC that a free link path indicated by a marking on the accompanying SL leads is the last available path in its link group. The information conveyed by the lead *ls''* and *als'* can therefore be used in the circuit SCC, for instance in the way described later when considering FIG. 13, to modify the selecting action as indicated.

The circuit SCC having made a selection of a particular link path available and suitable for the call, it indicates by a marking on the leads C the identity of that link path within its link group and therefore the identity of the C arrays to which it is connected on its calling and called sides. The circuit SCC also marks the relevant lead *fr* according to the particular pair of sections linked by the selected link path. The calling side route identifying circuit of the section on the calling side of the link, and the called side route identifying circuit of the section on the called side, receive this marking on leads *f* and *r* respectively, or on leads *r* and *f* respectively, according to the orientation ("forward or reverse") of the selected link path with respect to the section on the calling side. In the active calling and called side route identifying sub-circuits such as RIW–1 and RIX–*x*, this marking is accepted at gate GT16 or GT16' and marks via gate GT17, the lead *g* in the calling side sub-circuit and lead *d* in the called-side sub-circuit.

In the active calling side sub-circuit such as RIW–1 associated with the sub-unit serving the calling line, the marking on lead *g* opens gates GT18*g*, which therefore pass to the marker serving that sub-unit the following information: on loads G*g'*, S*g'* and L*g'* the identity of the calling line in terms of its group, sub-group and line in the sub-group; on leads C*g'* the identity of the sub-unit of the C array to which the selected link path is connected; and on leads U*d'* the identity of the unit in which the called line is included. The marking accepted on lead *f* or *r* is also passed to the marker over lead *f'* or *r'* as an initiating signal, and the marker also receives the marking on lead $g$ to indicate that the marker has to function in respect of a calling line.

In like manner the marker serving the sub-unit to which the active called-side route identifying sub-circuit pertains, receives from this sub-circuit via gates GT18*d*, opened by the marking on lead $d$, the following information: on leads C*d'*, S*d'* and L*d'* the identity of the called line in terms of its group, sub-group and line in the group; on leads C*d'* the identity in the relevant sub-unit of the C array to which the selected link path is connected; and on leads U*g'* the identity of the unit in which the calling line is included. The marking accepted on lead $r$ or $f$ is also passed to the marker over lead $r'$ or $f'$ as an initiating signal, and the marker also receives the marking on lead $d$ to indicate that it has to function in respect of a called line. The markers now have sufficient information to establish through their sub-units and the A rank, paths extending from the calling and called lines to opposite sides of the relevant link path, thereby to establish a through-path extending between these lines. The markers proceed to do this by coupling themselves to the appropriate ends of the link path, for instance through a separate co-ordinate switching array provided for this purpose, and by marking for operation the requisite cross-point switching means in the A, B and C ranks. The sub-units served by these markers are busied against selection in respect of another call until the first call has been set. This may be done for example by inhibiting, over leads (not shown) from the marker, the gates such as GT9 via which the calling and called side route identifying sub-circuits of these sub-units could otherwise be rendered active.

It will be noted that the same link path, being assumed to be "both-way" in its operation, may be selected for a call in either direction through the sub-units which it interconnects: that is, either of these sub-units may be the calling sub-unit while the other is the called sub-unit. However, the required orientation will be indicated according to whether a marker receives its initiating signal on lead $f'$ or on lead $r'$. One of the two markers controlling the establishment of a call, for instance the calling side marker, can therefore be arranged according to the lead on which its initiating signal is received, to select the direction of connection of a reversible transmission bridge circuit included in the selected link path. It will also be noted that for a call between two lines connected to the same A rank switching unit, the routes determined by the calling and called side route identifying sub-circuits through a sub-unit may include the same cross-points, and the two link path determinators associated with any pair of sections as aforesaid may present for selection link paths from the same link group. This gives rise to no conflict however, because only one of these link paths will be selected for use in the through-path over which the call is finally established.

In a reed relay cross-point system, the cross-point relays may and preferably would be arranged for operation by the markers in accordance with our co-pending application No. 134,905. A suitable marker arrangement for this purpose is illustrated by way of example, in a simplified schematic form, in FIG. 12, which will now be described.

Referring to FIG. 12, the marker M receives, from the calling or called side route identifying sub-circuit associated with its sub-unit, various markings as already described. These markings are stored in a storage arrangement LS*m* and give the following information: on G, S and L, the group, sub-group and line-in-group of the calling or called line; on C the C array to which the selected link path for the call is connected; on U the unit of the other line (i.e. called or calling); and on R (when a path is to be set up to a register) the vertical connection to which the register is connected in the C array. A marking on $r$ or $f$ initiates operation and indicates the required orientation of the supervisory transmission bridge circuit in the link path, and a marking on $g$ or $d$ indicates whether the marker has to function in respect of the calling side or the called side.

An initiating signal on $f$ or $r$ initiates through gate GT26 the operation of a sequence control circuit S which, by producing activating markings on output leads P0 . . . P5 in turn in that order, controls the subsequent sequence of operations of the marker.

The marker first couples itself to the selected link path, and to do so it uses the C marking (gated in gates GT 27 controlled by lead P0) in conjunction with the U or R marking, whichever may have been received. (It is recalled that this latter marking, in either case, identifies the vertical connection to which the link path is connected in the C array identified by the C marking.) The sets of leads C and UR carrying these markings are shown as being connected for operating a relay matrix CCX on a co-ordinate basis, a particular relay such as CC being operated. These relays, and all others in the marker, may be reed relays or electronic devices serving an equivalent function. Obviously for operation of the relays such as CC connected as indicated, the C and UR markings as applied to matrix CCX must be arranged to be constituted by different potentials of appropriate relative polarities.

A typical multi-wire connection which the marker may have to establish, comprising +, —, P, and H (holding) wires, is represented at the top of FIG. 12 and can be traced from the line circuit LC of the calling or called line (see top left of FIG. 6) through cross points CPA, CPB and CPC in the respective switching ranks A, B and C, to a link path LG including a reversible supervisory transmission bridge circuit SXB. This latter circuit performs the well known functions of such circuit and includes all the necessary components and connections for doing so. Such circuits being well known, no details of the circuit SXB have been illustrated other than those necessary to indicate the manner in which it is affected by the marker. To establish the connection just traced, cross-point relays RA, RB and RC have to be operated to close their contacts *ra, rb, rc* respectively.

On operation or relay CC the marker couples itself to the identified link LG, in particular to the P and H wires of the link, via a set of contacts *cc* of this relay. Over lead H' this puts a positive marking potential on the H wire of the link LG. Recalling that the group marking identifies a particular horizontal connection of the relevant C array and therefore a particular vertical connection of the relevant B array, that the sub-group marking identifies a particular horizontal connection in that B array and therefore a particular vertical connection in the relevant A array, and that the line marking identifies the vertical connection of the line in that A array (assuming the trunking arrangements of FIGS. 1 and 2) the marker now uses these markings to cause an earth marking to be applied in turn to leads *cl, bl, al* connected as shown. To this end the group marking is applied via a gate such as GT28 under control of lead P1, to operate one of a set of relays such as MC, which at its contacts *mc* applies an earth marking to lead *cl*. In conjunction with the applied positive marking, this operates cross-point relay RC, which in addition to closing its contacts *rc* also closes its contact *rc*1. In like manner a relay such as MB is next operated by the sub-group marking via gate such as GT29 under control of lead P2, contacts *mb* of this relay applying an earth marking which in conjunction with the applied positive potential and with relay MC now released, operates cross-point relay RB (which closes its contacts *rb* and *rb*1) and holds relay RC. Similarly a relay such as MA is subsequently operated by the line marking, via a gate such as GT30 under control of lead P3, and contacts *ma* apply an earth marking which, again in conjunction with the applied earth marking and with relay RB now released, operates cross-point relay RA and holds relay RB and RC. Relay RA closes its contacts *ra* and also its contacts *ra1*, of which the latter connects to the now-established series connection of relays RA, RB and RC a negative holding potential connected to the H-wire via a resistance RS2.

For a fuller explanation of the sequence of operations just described reference should be made to our aforesaid earlier application Serial No. 134,905.

Connection now having been established between the line circuit and the link path, the subsequent actions of the marker depend on whether it is the calling line or the called line.

The marker concerned with the calling line is given the function of controlling the reversal of the transmission bridge SXB if necessary. It is assumed that in the "forward" link groups connected to each section, the bridge circuits such as SXB are normally connected to deal with calls for which that section has to establish the calling side. If, therefore, a marking is received on the *r* lead by the marker dealing with the calling side, indicating that the selected link path is "reversed" with respect to that section, then it is necessary to reverse the bride circuit in the link. To this end, in the marker dealing with the calling side, a relay VR is operated by the marking on lead *g* via a gate GT32 controlled by lead P4. If a marking is present on lead *r*, it is then extended via contacts *vr* to the relay, contacts *cc* of the operated relay in matrix CCX and connection V to relay RV, which it operates, causing reversal of the bridge circiut such as SXB at change-over contacts *rv1* and *rv2*.

In the marked dealing with the called side, the marking on lead *d* operates a relay TR via gate GT33 controlled by lead P4. Operation of this relay connects the P-wire of the established connection via lead P′ and contacts *tr* to a bistable element BS3. If the called line is free (negative) the potential present on the P-wire via relay K in the line circuit (FIG. 6), operates the bistable element BS3 to its actuated condition, in which it operates, and holds operated, relay T. If the line is busy, relay T remains unoperated. Operation of relay T applies a busying earth potential to the P-wire via operated contacts *t1* and lead P1. It also applies a negative potential at contacts *t2* via contacts *cc* to a connection BF extending to the bridge circuit SXB, in which a polarised relay FR is operated as a result. This transfers the maintenance of the busy condition of the P-wire to circuit SXB, to which end a relay BB in this circuit is operated over contacts *fr* of relay FR and applies a busying earth potential to the P-wire at contacts *bb1* and a holding earth potential to the H-wire at contacts *bb2*. The cross-point relays RA, RB, RC now hold in series between this holding earth and the negative holding potential in the line circuit.

If the called line is busy (relay T unoperated) a gate GT34 controlled by lead P5 applies positive potential over contacts *t2* to the lead BF, causing a polarised relay BR to operate (instead of FR) in the circuit SXB, which then proceeds to return busy signal to the calling line in the usual manner (not shown). Relays FR, BB and BR would have their own holding circuits (not shown) so as to remain operated on subsequent release of the marker.

The action of the marker in establishing a connection to a register is similar, the register assuming the function of holding the connection once established.

It is emphasized that FIG. 12 is only intended to indicate one simple example of a suitable marker which can fulfill the functions required of it and that in practice the markers, through still fulfilling these functions, would usually be much more complex.

With the arrangement just described the relays RA, RB, RC, which are operated in the several switching ranks to establish a path to a register or to finally establish a through-connection for the call are held in series with each other. As a result, it is possible, should traffic considerations so require, for a final through-connection to include part of the originally established register path. Thus in FIG. 1 the chain-dotted through-connection and the dotted register path involve the same cross-point in, and the same (W) connection from, the A rank.

In order to permit such a through-connection to be presented by a route identifying sub-circuit for selection, it is necessary to over-ride the busy indication which will be obtained when the relevant connection (W) which extends into the sub-unit concerned is interrogated in the gate such as GT11. For this purpose the register can apply, to a lead *ss* which extends to the route identifying sub-circuits of this last mentioned sub-unit, a marking which simulates at the input of the gates such as GT12 a free condition of the connection in question. The cross-point relay common to both paths does not need to be released and re-operated but can be held operated from the register until the supervisory circuit establishes its holding condition, after which the register can be released and the consequent removal of the holding condition applied by it will release those relays which were involved exclusively in the register path, without interfering with the now established through-path.

Moreover for those connections whose free or busy conditions have to be ascertained by the route identifying circuits, these conditions can be ascertained by interrogating the potentials existing at corresponding points in the holding conductors (H) which are included in these connections and over which the series holding circuit for the operated reed relays is established. The operating windings of the relays included in a holding circuit provide a potential dividing action which gives the holding conductors a "busy" potential different from that which they have when not so included in a holding circuit, that is, when the connections including them are free. Thus if using pulse-plus-bias gates for interrogation, these potentials can be taken to the biasing inputs of the gates, which can then be interrogated by means of pulses applied to their pulse inputs: whether or not an output pulse is obtained from a gate would depend on the bias condition present at its bias input and thus on the condition of the connection whose holding conductor determines that bias condition.

Coming now to FIG. 13, the comparison and selection circuit SCC in FIG. 9 may take the following form. For the set leads SL from each link path determinator circuit LC there is a set of transistors such as TL1 . . . TL*r* each of which is individually primed on its base when, and only when, a free marking is present on the corresponding SL lead. Transistors TR11, TR1*l* . . . TR*r*1, TR*rl* are similarly provided and connected with respect to leads SR where present. Each transistor remains virtually non-conducting (as regards emitter-collector current flow) until an appropriate potential is applied to its emitter. Each of the leads SL and SR pertains to a particular link path in a group and therefore to a particular C array in a sub-unit as previously explained. Each transistor therefore has a similar pertinence. Similar sets of transistors are provided in respect to the sets of leads SL, and where appropriate SR, from the other determinators LC of FIG. 9, it being mentioned here that the leads SR have been shown as passing through the determinators for convenience in relating them to the switching sections, and that the determinators in fact perform no function in respect of these leads in the overall arrangement assumed for the purposes of the present description.

Still considering FIG. 13, a pulse generator PG4, when caused to generate by a starting signal applied to lead ST at an appropriate time, applies sequentially to leads PC1 . . . PC*r*, in that order, pulses of appropriate emitter potential for the transistors. These leads pertain respectively to the several C arrays of a sub-unit in the required order of precedence for these arrays, and each transistor has its emitter connected to the pulse lead which pertains to the same C array. A transistor which is primed will be rendered conductive when a pulse appears on the PC lead to which its emitter is connected, and a resultant collector output pulse will appear on a lead such as *ll* common to the transistors TL1 . . . TL*r*, or on a lead such as *lr*1 or *lrl* each of which is common to those transistors which in the set TR11 . . . TR*rl*, relate to corresponding vertical connections connected to registers in the several C arrays. An output pulse appearing on a lead such as *ll* will actuate a bistable element such as BS4 and by doing so will cause a signal to be applied over lead SP to stop the pulse generator PG4. An output pulse on a lead such as 1*r*1 or *lrl* will actuate a bistable element such as BS5 or BS6, and through a gate such as GT34 will cause a signal to be applied over lead SP to stop the pulse generator PG4. The PC lead on which appeared the pulse which resulted in stopping the pulse generator will remain marked and will indicate a chosen C array in the predetermined order of precedence. This will be the C array which has the highest precedence among those to which the marked SL or SR leads pertain in the several sets thereof extending from the several determinators LC. If a lead corresponding to this chosen C array is marked in more than one of the sets of leads such as SL or SR, more than one of the bistable elements such as BS4 will have to be activated or more than one of the elements such as BS5 and BS6. This means that two or more sections, or pairs of sections, are equally favourable for the call as regards packing of the C arrays. It is therefore necessary to select between these sections, or pairs of sections.

In the case of selection for establishing a call to a register, this can be done by passing the output markings from the activated bistable elements such as BS5 or BS6 into a "one-only" selector circuit represented by the rectangle OSR, which indicates its selection by marking a corresponding one of a set of output leads *sr*. This marking is applied via a gate such as GT35 to the lead *fr* which leads back to the relevant determinator LC for the purpose already explained. The particular output lead *sr* which is marked also corresponds to a register connected to a particular vertical connection in the C array, and the marking is therefore also applied to the corresponding one of a set of leads R to identify this vertical connection as previously explained. In the case of selection for establishing a call between calling and called lines via a link path, the output markings from the activated bistable elements such as BS4 are for the same purpose passed to a "one-only" selection circuit OSL which according to its selection marks one of a set of output leads *sl* each connected to the lead *fr* leading back to the relevant determinator LC. Suitable forms of "one-only" selection circuit are described for instance in our said earlier application Serial No. 122,137.

The foregoing has ignored the modifying effect of the presence of marking on lead *ls* (link group with only one or none of its link paths available) in the presence of a marking on lead *als* (another suitable link group has two or more link paths available). The presence or both those markings inhibits a selection which would take into use the last available link path of a group. To this end the leads *ls* have been shown as going to individual gates such as GT36, an output signal from which, when produced, holds the associated bistable element such as BS4 in its quiescent conditon and thereby prevents it from being activated by any signal on lead *ll*. The lead *als* is connected to all the gates such as GT36, so that they can produce an output signal, with the inhibiting action just described, only in the presence of a marking on lead *als*. If such marking is absent, indicating that none of the relevant link groups has two or more link paths available, then no inhibiting output signal is obtained from the gates such as GT36 and the selecting action proceeds without modification.

The foregoing descriptions with reference to the drawings have been given solely with a view to showing as simply as possible how the concepts of the present invention can be incorporated into a practical system. The system as described lends itself to the addition of many ancillary facilities and the provision of these might involve detail changes in system compared with what has been described but no attempt has been made to describe these here. Also it will be appreciated that changes may be made, without departing from the invention, not only in the circuit arrangements as described with reference to FIGS. 6–13 but also in the trunking arrangements described with reference to FIGS. 1–5. For instance it may be noted that whereas there has been indicated in FIG. 4 the connection of certain overlying link groups *lgo* each of which overlies corresponding sub-units in the several sections and links them (the link not being shown) with other sub-units likewise overlaid, it is possible for the overlying link groups each to overlie the sub-units of a particular section and to link them with the sub-units in another section similarly overlaid. (That is, in FIG. 4, the lines representing the overlying link groups would extend horizontally instead of vertically.) The latter arrangement would have the advantage that the overlying link groups could be so arranged as not to link already linked adjacent sections, thereby avoiding duplication of such linking.

Figure 5A:
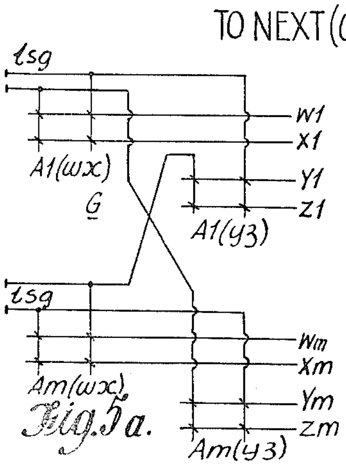
Figure 5B:
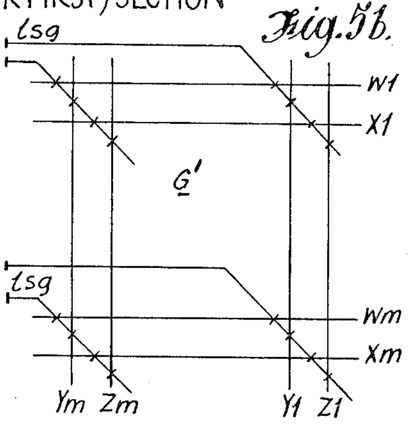

In connection with the modified arrangement illustrated by FIG. 5 for the A switching rank, it has already been explained that in each of the sub-groups *lsg* all of the lines have access to the B rank in section W and X over the same connection (e.g. W1 or X1 for the uppermost line group in FIG. 5*b*) whereas they have access to the B rank in sections Y and Z over different connections (e.g. Y1 to Y*m* or Z1 to Z*m* respectively). However by arranging the A rank arrays in a "square" formation as illustrated, with the number of lines per sub-group equal to the number of sub-groups per group (i.e. $m=10$ on the previous assumptions), no difficulty arises about the marking of the cross-points for operation because each line is still identified within its group in terms of its sub-group and line within the group, the only difference being that whereas for sections W and X the sub-group marking of a line identifies its horizontal connection into the sections while the line marking identifies its vertical connection in the A rank, the significance of the markings is reversed for sections Y and Z. Therefore for sections Y and Z it would only be necessary to arrange that the line and subgroup markings are transposed as presented to the route identifying circuits and markers of these sections. Similar manipulations are possible if the size of the B arrays is a whole multiple of the size of the A arrays. For instance if the B arrays are twice the size of the A arrays and the several groups of A arrays (G1 . . . G*n*) are regarded as alternately odd and even with an odd group affording access to one half of a double size B array and an even group affording access to the other half, then by deriving an odd/even marking and utilising it to indicate the appropriate half of the relevant B array, it remains possible to transpose the line and sub-group markings as may be necessary.

In FIGS. 5*a* and 5*b*, all the lines of each sub-group *lsg* have been indicated as having common access into sections W and X, and corresponding lines from the several sub-groups have been indicated as having common access into sections Y and Z. In each case the two sections are adjacent linked sections over which, subject to availability of free routes through them, a call could be established. However this would require that, in respect of a call between two of the several lines sharing such common access, the cross-points which give them this access must both be available, but might not be if there is a sudden increase of traffic on the access-sharing lines. The possibility of this limitation can be lessened if, as an alternative, the common access is given to non-adjacent sections, namely to W and Y on the one hand and to X and Z on the other hand.

Regarding the division of the lines into P- and Q-lines, it was stated earlier that the plurality of $m$ connections over which the lines of any particular group have access into the several sections (namely the connection W1 . . . W10, X1 . . . X10, Y1 . . . Y10 and Z1 . . . Z10 where $m=10$) could be distributed to the sub-units of the several sections as follows: W1–W10, X1–X5, Y1–Y5 and Z1–Z5 to the corresponding sub-units in the respective sections and X6–X10, Y6–Y10 and Z6–Z10 to different non-corresponding sub-units in their respective sections. Other modes of distribution are possible however: for instance alternate connections (e.g. X1, X3, X5, X7, X9) could go to the corresponding sub-unit and the remainder to the other sub-unit. If the distribution is the same for all sections (whatever may be the mode of distribution) it will be apparent from consideration of FIG. 4 that for a call between similar lines (i.e. both P or both Q) on the same unit, only four links are available (although each can be used in either direction) instead of the eight available for a call between lines on different units. This limitation of choice can be reduced by arranging that, as regards the connections extending into the Y and Z sections, their modes of distribution into the sections are similar but mutually inverse. That is, if connections Y1–Y5 go to the corresponding sub-unit and Y6–Y10 to a non-corresponding sub-unit, then connections Z1–Z5 would go to a non-corresponding sub-unit and Z6–Z10 to the corresponding sub-unit. Likewise if connections Y1, Y3, Y5 . . . go to the corresponding sub-unit and Y2, Y4 . . . to a non-corresponding sub-unit, connections Z1, Z3, Z5 . . . would go to a non-corresponding sub-unit and Z2, Z4 . . . to the corresponding sub-unit. It can be shown that this reduces the number of calls between lines in the same unit for which only four choices are possible.

What I claim is:

1. A telephone or like switching system employing co-ordinate switching arrays for establishing connections between lines served by the system, said system comprising:

a first co-ordinate switching rank to which said lines are connected;

a number of separate switching sections each of which comprises at least one further co-ordinate switching rank, the switching ranks of the several sections being mutually separate as between one section and another;

connections from said first switching rank to one side of the several sections, each line having access to that side of a plurality of said switching sections via said first switching rank and said connections;

a plurality of links interconnecting the switching sections externally at the other side thereof;

said switching ranks and links connected in an overall organization including between any two of said lines, a plurality of possible communication paths each extending from one of said two lines through the first switching rank and one of said sections to one of said links and from said link through another section and the first switching rank to the other of the two lines;

the system also including a section selection arrangement including means operable in respect of a call between any two lines for ascertaining conditions pertinent to the establishment of the call in the several sections and for selecting for the establishment of the call, in dependence with the ascertained conditions, such one of the possible communication paths as includes the sections and link that can best take the call having regard to these conditions.

2. A switching system as claimed in claim 1 wherein each switching section includes a plurality of co-ordinate switching arrays constituting a primary switching rank of the section and a further plurailty of such switching arrays interconnected with those of said primary switching rank and constituting a secondary switching rank of the section, the links being connected between the secondary rank switching arrays of the several sections and the said connections from the first switching rank being connected to the primary switching ranks of the sections in a manner according each line selective access to a primary rank switching array in each section.

3. A switching system as claimed in claim 1 wherein each link is constituted by a group of link paths and said section selection arrangement further includes means for selecting an available link path from the group thereof constituting the link in a possible communication path 4. A switching system as claimed in claim 1 wherein with the lines divided into groups and sub-groups, each sub-group is served by an individual first rank switching array which affords for the lines of its sub-group access thereof to connections of which one extends into each of the several sections and each is accessible through said array to all the lines of the same sub-group.

5. A switching system as claimed in claim 1 wherein links selectable for a local call comprise link paths each including supervisory transmission bridge circuit which is reversible so that one link path can serve in either direction for a call established through it.

6. A switching system as claimed in claim 1 wherein said section selection arrangement includes means for selecting a particular pair of sections and interconnecting link for a call in a manner tending to pack all calls into the switching arrays in an orderly manner minimizing blocking of subsequent calls.

7. A switching system as claimed in claim 1 wherein with the lines divided into groups and sub-groups, the lines of each group are connected to a first rank switching array through which the lines of each sub-group of the group have common access to connections extending into only some of the sections, and lines corresponding to each other in the several sub-groups of the same group have common access to connections extending into the other sections.

8. A switching system as claimed in claim 7 wherein the connections to which the lines of a sub-group have common access extend into non-adjacent sections, and the connections to which corresponding lines from the sub-groups have common access also extend into non-adjacent sections.

9. A switching system as claimed in claim 1 wherein with the lines divided into groups and sub-groups, the lines of each group are connected to a first plurality of first rank switching arrays through each of which the lines of a particular sub-group have common access to connections extending into only some of the sections, and a second plurality of first rank switching arrays through each of which lines which correspond to each other in the several sub-groups of the same group have common access to connections extending into the other sections.

10. A switching system as claimed in claim 9 wherein the connections to which the lines of a sub-group have common access extend into non-adjacent sections, and the connections to which corresponding lines from the sub-groups have common access also extend into non-adjacent sections.

11. A switching system as claimed in claim 5, wherein each sub-unit in each section is interconnected with all of the sub-units in the next section by individual links each able to serve in either direction for a call established through it, the sections being considered in a certain order with the first section constituting said next section in respect of the last section.

12. A switching system as claimed in claim 11 wherein of the connections extending from any one unit of the first switching rank into the several switching sections, certain of these connections are connected to one combination of sub-units in the several sections, and others are connected to a different combination of sub-units, each said combination consisting at least of one sub-unit from each section.

13. A switching system as claimed in claim 1 wherein said section selection arrangement comprises selection means individual to each section for determining available routes through the section from a calling line and from the called line to respective links and common selection means for selecting for the establishment of the call, from the routes selected in the several sections, a route through one section between the calling line and a link and a route through another section between the called line and the same link.

14. A switching system as claimed in claim 13 including for each section a calling side route identifier and a called side route identifier and means for feeding into said identifiers information as to the location of the calling and called lines on the switching equipment, each said calling side route identifier including means for determining routes available through the first switching rank and their own section between the calling line and a link affording connection towards the called line via another section, and each called side route identifier including means for determining routes available through the first rank and its own section between the called line and a link affording connection towards the calling line via another section.

15. A switching system as claimed in claim 14 wherein the route identifiers co-opertate in pairs, each pair consisting of the calling side route identifier of one section and the called side route identifier of another section linked to the first, and wherein with each link constituted by a pluarlity of link paths, the section selection arrangement includes a link path determinator for each pair of route identifiers and the two route identifiers of each such pair include means for feeding into their link path determinator, markings which indicate, in respect of a link between the pertinent sections, the free or busy conditions of those link paths thereof which have access to the calling line and those which have access to the called line over available routes, the link path determinator including means for ascertaining, and for indicating by appropriate output markings, which of these link paths that are free have available access to both the calling and the called lines.

16. A switching system as claimed in claim 15 wherein the section selection arrangement further includes a selection and comparison arrangement responsive to said output markings from the several link path determinators for selecting, from the free link paths indicated by these markings, one of the link paths of the link interconnecting those sections which together with this selected link path, can best take the call.

17. A switching system as claimed in claim 1 wherein:

the first switching rank comprises a plurality of switching arrays arranged as a number of switching units each having a proportion of the lines connected thereto;

a plurality of connections extending from each such unit into each of the several switching sections whereby each said unit affords selective access between its proportion of the lines and said plurality of connections;

the switching arrays of the several sections considered together are also divided into units of which the switching arrays included in a particular unit in a particular section constitute a sub-unit;

the links interconnect each sub-unit of a section with certain sub-units in the other sections, these certain sub-units including at least one from each unit;

and a proportion of the connections which extend into each section from the first rank link are connected to each sub-unit in that section whereby the switching arrays constituting the sub-unit afford selective access between such proportion of the connections and the links interconnecting that sub-unit with sub-units of the other sections.

18. A switching system as claimed in claim 17 including for each section a calling side route identifier and a called side route identifier and means for feeding into said identifiers information as to the location of the calling and called lines on the switching equipment, each said calling side route identifier including a route identifying sub-circuit individual to each sub-unit of its section for determining available routes through the first switching rank and its sub-unit between the calling line and a link affording connection towards the called line via another section, and each called side route identifier including a route identifying sub-circuit individual to each sub-unit of its section for determining available routes through the first swtiching rank and its sub-unit between the called line and a link affording connection towards the calling line via another section, together with means for rendering operative the route identifying sub-circuits of the sub-units to which the calling and called lines respectively have access.

19. A switching system as claimed in claim 18 wherein the route identifiers cooperate in pairs, each pair consisting of the calling side route identifier of one section and the called side route identifier of another section linked to the first, and wherein with each link constituted by a plurality of link paths, the section selection arrangement includes a link path determinator for each pair of route identifiers and the two route identifiers of each such pair include means for feeding into their link path determinator markings which indicate, in respect of a link between the pertinent sections, the free or busy conditions of those link paths thereof which have access to the calling line and those which have access to the called line over available routes, the link path determinator including means for ascertaining and for indicating by appropriate output markings which of these link paths that are free have available access to both the calling and the called lines.

20. A switching system as claimed in claim 19 wherein the section selection arrangement further includes a selection and comparison arrangement responsive to said output markings from the several link path determinators for selecting from the free link paths indicated by these markings, one of the link paths of the link interconnecting those sections which, together with this selected link path, can best take the call.

21. A telephone or like switching system as claimed in claim 17 wherein in respect of each first rank switching unit and the lines connected thereto:

the lines served thereby are divided into line groups;

the unit comprises a plurality of first rank switching arrays each having a proportion of the lines connected thereto;

each first rank switching array has a plurality of connections extending therefrom one into each switching section and each accessible through such switching array to the lines connected thereto, each line group having an individual group of such connections extending into each section from the totality of first rank switching arrays to which the lines of the line group are connected;

each sub-unit of each switching section comprises a plurality of primary switching arrays and a plurality of secondary switching arrays interconnected with the primary switching arrays within the sub-unit;

the links externally interconnect the sections between the secondary switching arrays of the sub-units thereof and each link is constituted by a group of link paths, said section selection arrangement including means for selecting an available link path from the group thereof constituting the link in a possible communication path;

each primary switching array of each sub-unit in each section has one set of co-ordinate connections constituted by a proportion of those connections from said first switching rank which have corresponding positional relationships as connected to the first rank switching arrays, and another set of co-ordinate connections extending one to each of the secondary switching arrays in the same sub-units of the section;

each of the secondary switching arrays in each sub-unit having one set of co-ordinate connections constituted by respective connections from the several primary arrays, the connections from each primary array having corresponding positional relationships as connected to the secondary arrays, and another set of co-ordinate connections at least some of which are connected to respective link paths included in different ones of a plurality of link groups constituting the links interconnecting the sub-unit with the other sections, the co-ordinate connections to which the link paths of each group are connected having corresponding positional relationships in the secondary arrays.

22. A switching system as claimed in claim 21 including registers connected in at least some of the secondary switching arrays of each sub-unit to co-ordinate connections in the sets thereof to which the link paths are connected.

23. A switching system as claimed in claim 21, wherein of the connections extending into the several switching sections in respect of any line group, certain of these connections are connected to one combination of sub-units in the several sections and others are connected to a different combination of sub-units, each said combination consisting of one sub-unit from each section, and connections which are connected from the same line group to different sub-units in a section being distributed between these sub-units in a particular mode.

24. A switching system as claimed in claim 1 wherein in at least two sections in each of which connections from the same line group are connected to different sub-units, the modes of distribution of these connections between these sub-units are the same but mutually inverse.

25. A telephone or like switching ssytem employing co-ordinate switching arrays for establishing connections between lines served thereby and divided into line groups, said system comprising, in respect of a plurality of said line groups constituting a unit:

a plurality of co-ordinate switching arrays constituting a first switching rank and each having connected thereto a proportion of the lines;

a plurality of separate switching sections each comprising a plurality of co-ordinate switching arrays constituting a primary switching rank of the section and another plurality of such switching arrays constituting a secondary switching rank of the section and interconnected with the primary rank switching arrays within the section, the switching arrays of the several sections being mutually separate as between one section and another;

a plurality of connections extending one into each switching section from each first rank switching array and each accessible through such switching array to the lines connected thereto, each line group having an individual group of such connections extending into each section from the totality of first rank switching arrays to which the lines of the line group are connected;

a plurality of links externally interconnecting the sections betwene the secondary switching ranks thereof;

each primary switching array in a section having one set of co-ordinate connections constituted by connections from said first switching rank which have corresponding positional relationships as connected to the first rank switching arrays, and another set of co-ordinate connections extending one to each of the secondary switching arrays in the section;

each of the secondary switching arrays having one set of co-ordinate connections constituted by respective connections from the several primary arrays, the connections from any one primary array having corresponding positional relationships as connected to the secondary arrays, and another set of co-ordinate connections at least some of which are connected to respective links each interconnecting the sections concerned with another section.

26. A switching system as claimed in claim 25 having registers connected to some of the connections in said other set of co-ordinate connections of the secondary switching arrays.

References Cited by the Examiner

UNITED STATES PATENTS

| | | | |
|---|---|---|---|
| 2,853,552 | 9/58 | Oberman | 179—22 |
| 2,913,534 | 11/59 | Henquet et al. | 179—22 |
| 2,925,474 | 2/60 | Kinsey | 179—22 |
| 3,038,968 | 6/62 | Jabezynski et al. | 179—22 |
| 3,041,409 | 6/62 | Zarouni | 179—22 |

ROBERT H. ROSE, *Primary Examiner.*

WILLIAM C. COOPER, *Examiner.*